(12) United States Patent
Knas et al.

(10) Patent No.: US 11,557,156 B1
(45) Date of Patent: Jan. 17, 2023

(54) AUGMENTED REALITY SYSTEM FOR REMOTE PRODUCT INSPECTION

(71) Applicant: Massachusetts Mutual Life Insurance Company, Springfield, MA (US)

(72) Inventors: Michal Knas, Monson, MA (US); Jiby John, Suffield, CT (US); Damon DePaolo, Barkhamsted, CT (US); Payton Shubrick, Springfield, MA (US)

(73) Assignee: MASSACHUSETTS MUTUAL LIFE INSURANCE COMPANY, Springfield, MA (US)

( * ) Notice: Subject to any disclaimer, the term of this patent is extended or adjusted under 35 U.S.C. 154(b) by 264 days.

(21) Appl. No.: 16/895,684

(22) Filed: Jun. 8, 2020

Related U.S. Application Data

(60) Provisional application No. 62/858,038, filed on Jun. 6, 2019.

(51) Int. Cl.
| | |
|---|---|
| *G06T 7/00* | (2017.01) |
| *G07C 5/00* | (2006.01) |
| *G06F 3/16* | (2006.01) |
| *G06F 3/01* | (2006.01) |
| *G06T 17/20* | (2006.01) |
| *G06T 19/20* | (2011.01) |

(52) U.S. Cl.
CPC ............ *G07C 5/008* (2013.01); *G06F 3/017* (2013.01); *G06F 3/167* (2013.01); *G06T 7/001* (2013.01); *G06T 17/20* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 10,791,265 B1 * | 9/2020 | Lambert | ............... G06Q 40/08 |
| 2014/0263629 A1 * | 9/2014 | McQuade | ............ G06Q 20/342 |
| | | | 235/381 |
| 2020/0232884 A1 * | 7/2020 | Onekea | ................... G06T 7/001 |

\* cited by examiner

*Primary Examiner* — Yi Wang
(74) *Attorney, Agent, or Firm* — Foley & Lardner LLP

(57) ABSTRACT

Disclosed herein is a product inspection apparatus that may include an electronic device having a visual inspection software application. The visual inspection software application may activate a camera of the electronic device to capture images of a product, such as a vehicle. A display screen of the electronic device may present product images. The product images may be digitally processed, and augmented by the addition of computer-generated images associated with a status of inspection of each element of the vehicle in the product images. Each computer-generated image may include a graphical indicator associated with the status of inspection of a particular element. Each computer-generated image may be projected on top of a real world image of the particular element presented on the display screen.

20 Claims, 8 Drawing Sheets

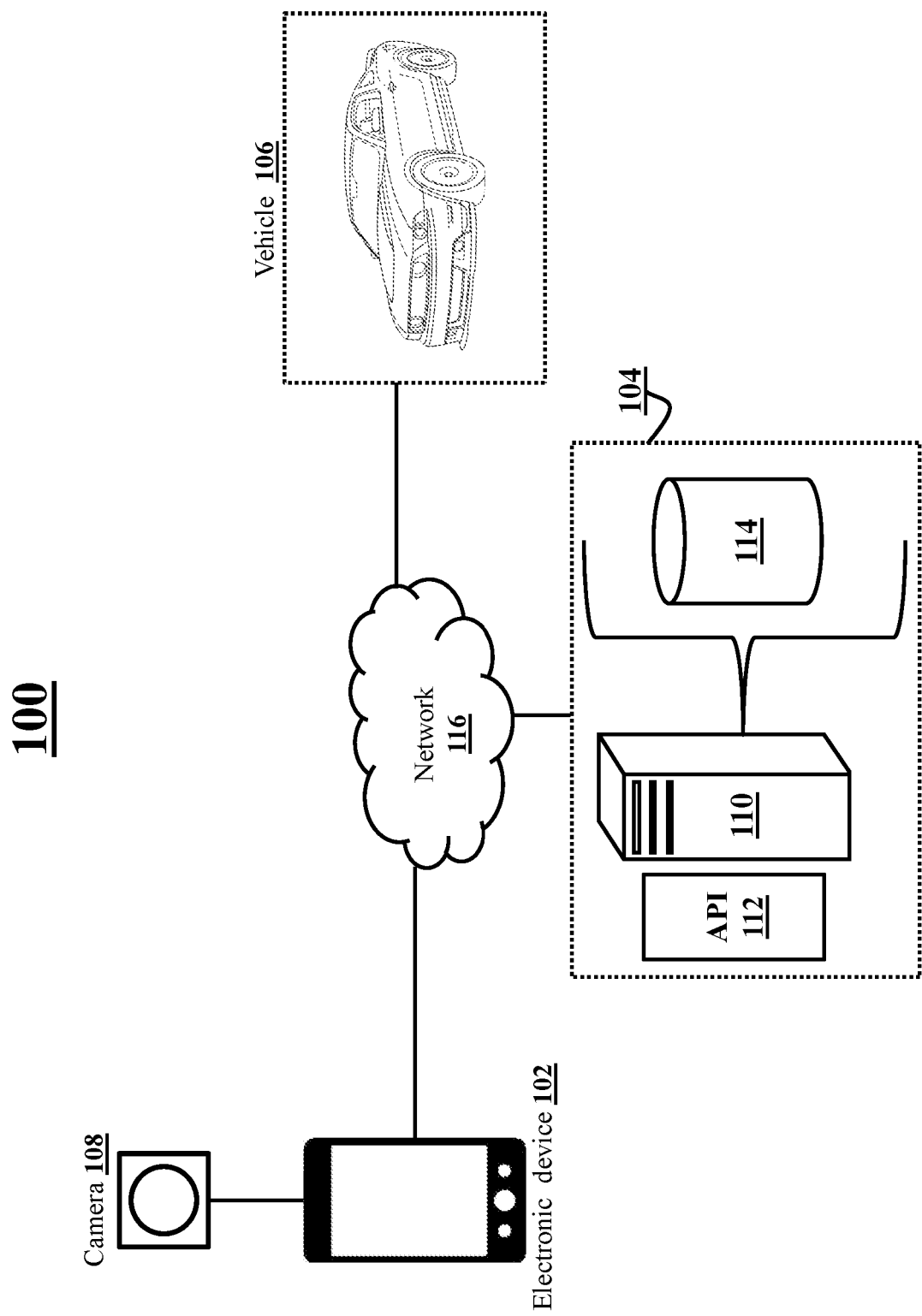

AUGMENTED REALITY SYSTEM FOR REMOTE PRODUCT INSPECTION

CROSS REFERENCE TO RELATED APPLICATIONS

This application claims priority to U.S. Provisional Patent Application No. 62/858,038, filed Jun. 6, 2019, which is incorporated by reference in its entirety.

TECHNICAL FIELD

This application relates generally to a field of product inspection using electronic imaging methods/systems.

BACKGROUND

Various product regulations require that each product (for example, a vehicle) comply with certain record keeping procedures, which may include maintenance of vehicle inspection reports and vehicle service information. To comply with these regulations, a driver of a vehicle must frequently inspect their vehicle for periodic scheduled maintenance and/or keep a record of repair and service information of the vehicle based on the inspection. Current inspection methods generally involve the inspection of the vehicle at a vehicle service center, which requires the vehicle to be physically present at the vehicle service center. Such an in-center inspection process typically takes several hours to complete. Accordingly, the in-center inspection process of taking the vehicle to the vehicle service center for the inspection is quite burdensome and time consuming for the user.

Transmitting images of the vehicle to be inspected to the vehicle service center has proven to be a less than desirable solution to the above-described problem. First, when receiving images of the vehicle from the user, a receiving server of the vehicle service center cannot identify whether the images are indeed captured from the vehicle, which has to be inspected. Therefore, authenticity of the images of the vehicle is not readily apparent, which is undesirable. Second, the vehicle service center uses a human-driven process where an administrator validates the images of the vehicle. Such validation process is heavily reliant upon the administrator's subjective understanding and skills, which is also undesirable.

SUMMARY

For the aforementioned reasons, what is therefore needed is a product inspection apparatus that eliminates a need for an in-center inspection of a product, such as a vehicle. What is also needed is an efficient computer-implemented product inspection system, which is configured to validate an authenticity of images of the vehicle and identify whether the images visually pass an inspection in real time.

The product inspection apparatus may be configured to operate a visual inspection software application, which may enable a remote inspection of every element of the vehicle using augmented reality for all periodic, scheduled inspections of the vehicle. The features of the product inspection apparatus and the visual inspection software application may be applicable for remote inspection of various products other than the vehicles, such as home appliances.

The product inspection apparatus may include an electronic device, which may execute the visual inspection software application. The visual inspection software application may activate a camera of the electronic device to capture a live video or images of the vehicle. The visual inspection software application may activate the camera when the electronic device is within a predetermined distance from the vehicle and at a particular field of view with respect to the vehicle. A display screen of the electronic device may present the video or the images of the vehicle captured by the camera. The video or the images may be digitally processed, and augmented by the addition of computer-generated images associated with a status of inspection of each element (for example, a rear view and/or a side view mirror) of the vehicle. Each computer-generated image may include a graphical indicator associated with the status of inspection of a particular element. Each computer-generated image may be projected on top of (e.g., as an additional layer to) a real world image of the particular element presented on the display screen.

The electronic device may select the graphical indicator based on a result of inspection of the particular element. For instance, the electronic device may select a check mark (√) as the graphical indicator when a captured image of a first element of the vehicle matches with a reference image of the first element. The computer-generated image of the check mark is super-imposed as an overlay image on the captured image of the first element presented on the display screen. The computer-generated image of the check mark can also be placed adjacent to the captured image of the first element presented on the display screen. In another instance, the electronic device may select a cross mark (X) as the graphical indicator when the captured image of the first element of the vehicle does not match with the reference image of the first element. The computer-generated image of the cross mark is super-imposed as the overlay image on the captured image of the first element presented on the display screen. The computer-generated image of the cross mark can also be placed adjacent to the captured image of the first element presented on the display screen. When captured images of all elements are checked against reference images of all elements, the electronic device may generate and present a graphical component on the display screen. The graphical component may correspond to a web link to download an inspection report of the vehicle.

In one embodiment, a method comprises establishing, by a server associated with an electronic device, an electronic communication session with a processor of a vehicle, wherein the server receives a unique identifier of the vehicle during the electronic communication session, and wherein the server monitors a distance between the electronic device and the vehicle; retrieving, by the server from a database, a multi-dimensional wireframe of the vehicle based on the unique identifier; determining, by the server, a position and a direction of an electronic device relative to the vehicle using a direction sensor of the electronic device when a user operating the electronic device scans the vehicle using a camera; displaying, by the server on the electronic device, a layout of a first element of the vehicle, and wherein the server prompts the user to align the first element displayed on the electronic device with a corresponding first element of the vehicle from a particular position and direction relative to the vehicle; when the corresponding first element of the vehicle is aligned with the first element displayed on the electronic device, causing, by the server, the camera to capture a first image of the vehicle comprising the first element; retrieving, by the server, a set of reference images associated with the vehicle based on the unique identifier; and when the first element in the first image matches a corresponding first element in the set of reference images, displaying, by the server on the electronic device, a composite image not captured by the camera, wherein the composite image is overlaid on the first image, the composite image comprising a notification corresponding to a status of an inspection of the first element.

In another embodiment, a computer system comprises a server in communication with an electronic device, the server comprising a processor and a non-transitory computer-readable medium containing instructions that when executed by the processor causes the processor to perform operations comprising establish an electronic communication session between the electronic device and a processor of a vehicle, wherein the server receives a unique identifier of the vehicle during the electronic communication session, and wherein the server monitors a distance between the electronic device and the vehicle; retrieve from a database, a multi-dimensional wireframe of the vehicle based on the unique identifier; determine a position and a direction of an electronic device relative to the vehicle using a direction sensor of the electronic device when a user operating the electronic device scans the vehicle using a camera to generate scan data; display on the electronic device, a layout of a first element of the vehicle, and wherein the server prompts the user to align the first element displayed on the electronic device with a corresponding first element of the vehicle from a particular position and direction relative to the vehicle; when the corresponding first element of the vehicle is aligned with the first element displayed on the electronic device, cause the camera to capture a first image of the vehicle comprising the first element; retrieve a set of reference images associated with the vehicle based on the unique identifier; and when the first element in the first image matches a corresponding first element in the set of reference images, display on the electronic device, a composite image not captured by the camera, wherein the composite image is overlaid on the first image, the composite image comprising a notification corresponding to a status of an inspection of the first element.

In another embodiment, a method may include establishing, by a server associated with an electronic device, an electronic communication session with a processor of a vehicle, wherein the server receives a unique identifier of the vehicle during the electronic communication session, and wherein the server monitors a distance between the electronic device and the vehicle; retrieving, by the server, a set of reference images associated with the vehicle based on the unique identifier; initiating, by the server, a camera associated with the electronic device; displaying, by the server on the electronic device, a video stream captured in real time by the camera, the video stream comprising a set of captured images; executing, by the server, an image recognition protocol to identify one or more elements of the vehicle within each captured image; when the electronic device is within a predetermined proximity to the vehicle and when a captured image has at least one element that matches a corresponding element within at least one reference image: displaying, by the server, a composite image not captured by the camera, wherein the composite image is overlaid on the captured image within the video stream, the composite image comprising a notification corresponding to a status of an inspection; updating, by the server, a data record corresponding to an identified element in the captured image to generate an updated data record, the updated data record comprises the status of the inspection corresponding to the identified element; and when a predetermined number of elements identified within the set of captured images match corresponding elements within the set of reference images, displaying, by the server, a graphical component corresponding to a successful completion of an inspection.

In another embodiment, a system may include an electronic device and a server. The server is configured to establish an electronic communication session between the electronic device and a processor of a vehicle, wherein the server receives a unique identifier of the vehicle during the electronic communication session, and wherein the server monitors a distance between the electronic device and the vehicle; retrieve a set of reference images associated with the vehicle based on the unique identifier; initiate a camera associated with the electronic device; display on the electronic device, a video stream captured in real time by the camera, the video stream comprising a set of captured images; execute an image recognition protocol to identify one or more elements of the vehicle within each captured image; when the electronic device is within a predetermined proximity to the vehicle and when a captured image has at least one element that matches a corresponding element within at least one reference image: display a composite image not captured by the camera, wherein the composite image is overlaid on the captured image within the video stream, the composite image comprising a notification corresponding to a status of an inspection; update a data record corresponding to an identified element in the captured image to generate an updated data record, the updated data record comprises the status of the inspection corresponding to the identified element; and when a predetermined number of elements identified within the set of captured images match corresponding elements within the set of reference images, display a graphical component corresponding to a successful completion of an inspection.

It is to be understood that both the foregoing general description and the following detailed description are exemplary and explanatory and are intended to provide further explanation of the subject matter as claimed.

BRIEF DESCRIPTION OF THE DRAWINGS

The accompanying drawings constitute a part of this specification and illustrate embodiments that, together with the specification, explain the subject matter.

FIG. 1 shows components of a product inspection system, according to an embodiment.

DETAILED DESCRIPTION

Figure 2A:
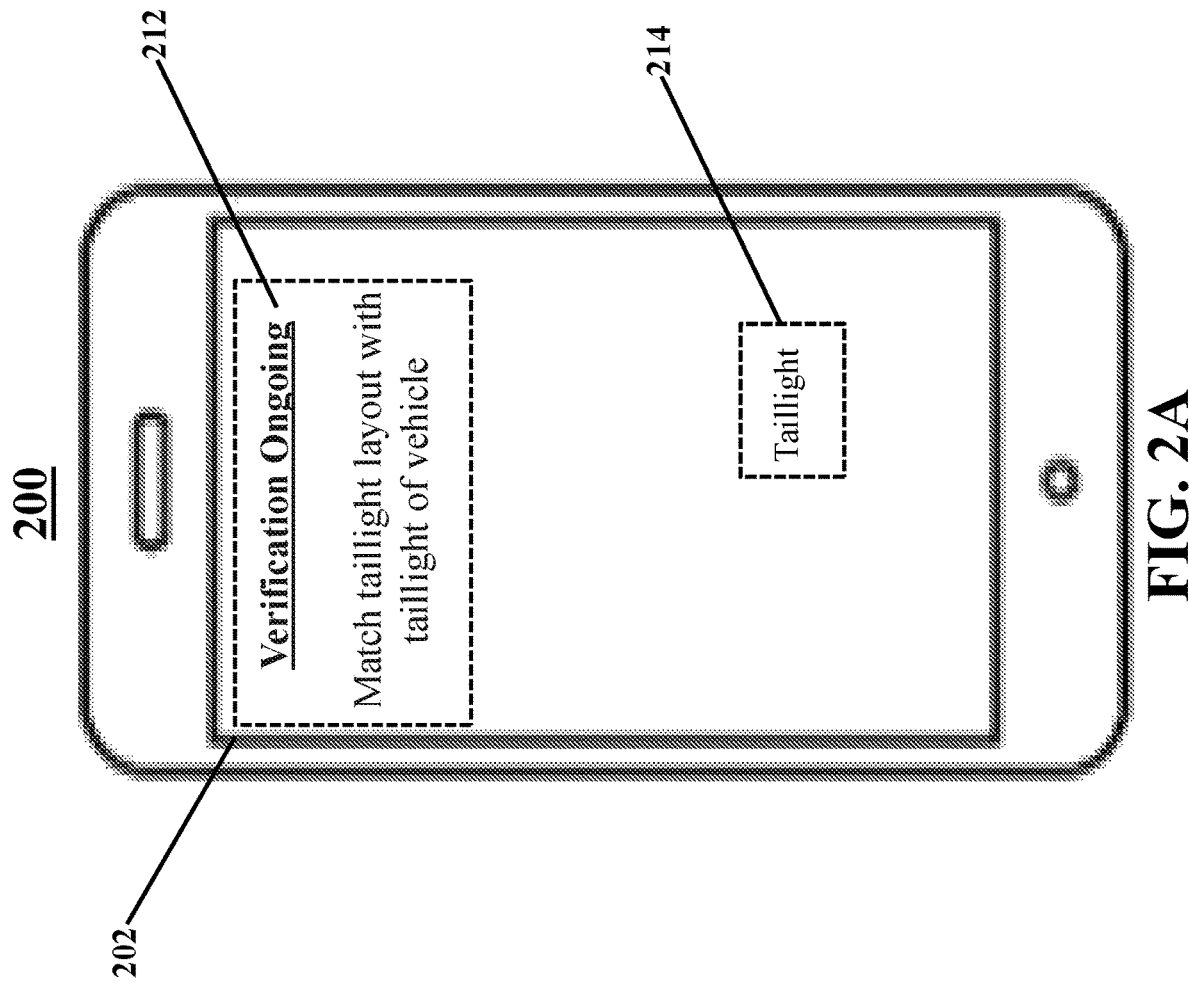
FIG. 2A shows a graphical user interface of an electronic device displaying a visual inspection software application, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

A user may use a mobile device to view and inspect a product, such as a vehicle. The mobile device may execute a visual inspection software application. The visual inspection software application may be associated with a server, and communicate with the server over a wireless network. The visual inspection software application may also communicate with a processor of the vehicle over the wireless network. The visual inspection software application may receive an identification number of the vehicle during a communication session between the mobile device and the vehicle.

When the mobile device is within a predetermined proximity of the vehicle, the visual inspection software application may activate a camera of the mobile device. When the camera is directly viewing the vehicle, the visual inspection software application may allow the camera of the mobile device to capture images. The camera may be associated with the visual inspection software application. The camera may capture the images of different elements of the vehicle, which is in a predetermined field of view and direction with respect to the camera of the mobile device. A display screen of the mobile device may present the captured images. The mobile device may transmit the captured images to the server. The server may normalize and process the captured images to identify each element (for example, a head light and a tail light) within the captured images. The server may also retrieve reference images associated with the identification number of the vehicle from a database.

The server may compare identified elements in the captured images with corresponding elements in the reference images. When a first element (for example, a right side tail light) in a first captured image match with a same corresponding element (for example, the right side tail light) in the reference images, the server may generate and overlay a first composite image not captured by the camera adjacent to the first element in the first captured image presented on the display screen of the mobile device. The first composite image may include a first graphical indicator. The first composite image may be disposed within a field of view of the user and may visually distinguish the first graphical indicator from all other elements of the vehicle in the first captured image. The first graphical indicator may be a check mark symbol (√). The check mark symbol may visually indicate to the user that the first element has passed an inspection.

When a second element (for example, a left side head light) in the first captured image does not match with the corresponding element (for example, the left side head light) in the reference images, the server may generate and overlay second composite image not captured by the camera adjacent to the second element in the first captured image presented on the display screen of the mobile device. The second composite image may include a second graphical indicator. The second composite image may be disposed within the field of view of the user and may visually distinguish the second graphical indicator from all the other elements of the vehicle in the first captured image. The second graphical indicator may be a cross mark symbol (X). The cross mark symbol may visually indicate to the user that the second element has failed the inspection.

The graphical indicators, such as the first graphical indicator and the second graphical indicator may be in control of the user such that a manipulation of the graphical indicators is intended to be communicative of user instructions. The user may interact with each graphical indicator through hand gestures, tool gestures, or voice commands. Each graphical indicator may be selectively positioned on the first captured image for purposes of communicating instructions to an applications program of the visual inspection software application controlling the display screen of the mobile device, in response to the user interaction with each graphical indicator. In response to receiving the instructions, the applications program may cause a message to pop up on the display screen. The message may include a text memo. The text memo may include information associated a name and a current status of the inspection of corresponding element.

When the comparison of all identified elements in the captured images with all corresponding elements in the reference images is completed, the server may generate a graphical component corresponding to a successful completion of the inspection of the vehicle. The server may display the graphical component on the display screen of the mobile device. The graphical component may include an inspection message. The inspection message may include a date, a time, and a location of the inspection. The inspection message may further include a name and a total number of non-faulty elements based on the remote inspection of the vehicle. The inspection message may further include a name and a total number of faulty elements based on the remote inspection of the vehicle.

FIG. 1 shows an example of a product inspection system 100. The product inspection system 100 may include an electronic device 102, a visual inspection application sub-system 104, and a vehicle 106. The visual inspection application sub-system 104 may include a server 110, an Application Programming Interface (API 112), and a database 114.

The electronic device 102, a processor of the vehicle 106, and various components of the visual inspection application sub-system 104 communicate with each other over a network 116. The network 116 may include, but is not limited to, private or public local area network, wireless local area network, metropolitan area network, wide-area network, and the Internet. The network 116 may further include both wired and wireless communications according to one or more standards via one or more transport mediums. The communication over the network 116 is in accordance with various communication protocols such as transmission control protocol and internet protocol, user datagram protocol, and institute of electrical and electronics engineers communication protocols. The network 116 may further include wireless communications according to Bluetooth specification sets, or another standard or proprietary wireless communication protocol. The network 116 may further include communications over a cellular network, including, for example, a global system for mobile communications, code division multiple access, and enhanced data for global evolution network.

The product inspection system 100 is described in a context of server-executable instructions, such as program modules, being executed by the server 110. The program modules may include software programs, objects, components, data structures, etc. that perform product inspection tasks or implement particular abstract data types. The features of the product inspection system 100 may be practiced either in a server device or in a distributed server environment, where the product inspection tasks are performed by one or more servers 110, which are linked through the network 116. In the distributed server environment, the program modules may be located in both local and remote computer storage media including memory storage devices.

The product inspection system 100 may operate (e.g., may be implemented) in a local computing environment where the server 110 may generate and execute product inspection tasks, such as vehicle inspection tasks. The database 114 and application programs associated with the server 110 may be stored and executed on local computing resources. The server 110 may locally query the database 114 to retrieve a set of reference images associated with the vehicle 106. The database 114 may store records of the set of reference images associated with the vehicle 106, which are summarized according to an identifier associated with vehicle 106. The server 110 may compare captured images of the vehicle 106 by the electronic device 102 with the reference images associated with the vehicle 106 to identify faulty elements and non-faulty elements of the vehicle 106. The server 110 may present a list of the faulty elements and the non-faulty elements of the vehicle 106 on a display screen of the electronic device 102.

The product inspection system 100 may operate in a cloud-computing environment where the electronic device 102 and the server 110 may be cloud-optimized. The electronic device 102 may execute a visual inspection software application to generate and execute product inspection tasks. Various application programs associated with the visual inspection software application and data of the electronic device 102 data may be stored and executed on the remote cloud-based server 110 accessed over a network cloud. In operation within the cloud-computing environment, a web browser on the electronic device 102 may interface with an application program corresponding to the visual inspection software application. Utilizing the visual inspection software application, a user of the electronic device 102 may initiate execution of the product inspection tasks. A camera 108 of the electronic device 102 may then capture images of the vehicle 106. The electronic device 102 may transmit captured images to the remote cloud-based server 110. The remote cloud-based server 110 may query the database 114 to retrieve the set of reference images associated with a unique identifier of the vehicle 106. The remote cloud-based server 110 may compare the captured images of the vehicle 106 with the reference images associated with the vehicle 106 to identify faulty elements and non-faulty elements of the vehicle 106. The remote cloud-based server 110 may present a list of the faulty elements and the non-faulty elements of the vehicle 106 on the display screen of the electronic device 102.

A vehicle 106 may include a vehicle frame, which may be a supporting structure of the vehicle 106. The vehicle frame may support multiple elements of the vehicle 106. The elements may include, but not limited to, a head light, a tail light, and a side view mirror, among others. The vehicle 106 may include a control unit. The control unit may be connected to a data bus to control various items of electrical equipment installed in the vehicle 106. The control unit may be provided for controlling lights, sensors (for example, direction sensors), etc. The control unit may include a software memory storing an interface software program for connecting an application software program, such as the visual inspection software application with an operating system. The control unit may further include a central processing unit having processors and microprocessors for performing computation of the application software program and the interface software program. The control unit may be associated with a presentation screen and input devices of the vehicle 106. The input devices may include switches, touchscreens, keyboards, pointer devices, or other devices.

An electronic device 102 is a portable or a non-portable computing device that performs operations, such as a remote vehicle inspection process according to programming instructions. The user may operate the electronic device 102. The electronic device 102 may include a processor or a microprocessor for performing computations for carrying the functions of the electronic device 102. The processor may include a graphics processing unit specialized for rendering and generating computer-generated graphics. The examples of the electronic device 102 may include, but are not limited to, a cellular phone, a mobile phone, a mobile device, a tablet computer, a head-mounted display, smart glasses, wearable computer glasses, a personal data assistant, or personal computer. In augmented reality, the electronic device 102 may be used to project or superimpose a computer-generated image onto the user's view of the real world (such as of the vehicle 106). For ease of explanation, FIG. 1 shows a single mobile device functioning as the electronic device 102, however, it should be appreciated that some embodiments may include a number of devices capable of performing the various product inspection tasks described herein.

The electronic device 102 may include an operating system for managing various resources of the electronic device 102. The API 112 associated with the operating system of the electronic device 102 may allow various application programs to access various services offered by the operating system. For example, the API 112 may be configured for setting up wired or wireless connections to the visual inspection application sub-system 104. As a result, the electronic device 102 is capable of communicating with various software applications and devices of the visual inspection application sub-system 104 through the network 116 using wired or wireless communication capabilities. For instance, the electronic device 102 may be communicably connected to the server 110, the processor of the vehicle 106, and the database 114 via the network 116.

The electronic device 102 may include input and output devices, touch screen, keypad, microphone, mouse, touch screen display, and a graphical user interface (for example, a display screen). The input and output devices may allow user interaction with various programs and computer software applications configured to communicate with the visual inspection application sub-system 104 in order to complete and record a remote vehicle inspection process of the vehicle 106. To enable the communication between the electronic device 102 and the visual inspection application sub-system 104, the electronic device 102 may have an augmented reality application installed on its operating system. The user may use the augmented reality application to access and interact with the visual inspection application sub-system 104 in order to complete the remote vehicle inspection process of the vehicle 106 as an augmented reality experience.

The electronic device 102 may include an imaging equipment to capture images and videos of the vehicle 106, which may situated at any remote location. The imaging equipment may be integrated in the electronic device 102, but the imaging equipment can be separate from the electronic device 102 and communicatively coupled thereto. The imaging equipment may include a camera 108. The electronic device 102 may store captured video and captured images of the vehicle 106 by the camera 108 in the database 114.

The electronic device 102 may include the display screen, which may present the captured video and the captured images of the vehicle 106. The display screen may be implemented as a light emitting display for presentation of the captured video and the captured images of the vehicle 106 in an interactive and a visual form. The display screen may include glasses for projection of visual information (such as a computer-generated image indicating a status of the inspection) onto the captured video or the captured images of the vehicle. The display screen may further include a head-mounted display system configured for optically presenting information, such as the captured video and the captured images of the vehicle 106 into the eyes of the user through a virtual retinal display.

The electronic device 102 may include one or more sensors configured to detect a direction of the electronic device 102 with respect to the vehicle 106. Specifically, the sensors (e.g., direction sensors) may be configured to detect a direction and an orientation of the camera 108 with respect to the vehicle 106. Non-limiting examples of a direction sensor may include a digital compass, accelerometer, gyroscope, barometer, magnetic and/or gravity field sensors, tilt sensors, and like. The electronic device 102 may use one or more of these sensors to identify a direction faced by the electronic device 102. Specifically, the electronic device 102 (or the server 110) may identify whether the electronic device (e.g., the camera 108) is facing the vehicle 106.

The electronic device 102 may use magnetic and gravity field sensors to digitally measure the direction of Magnetic North and the downward direction of the electronic device 102. The electronic device 102 may also use a tilt sensor to identify gravity and tilt data associated with the electronic device 102 and/or camera 108. For instance, the electronic device 102 may be equipped with an inclinometer or clinometer sensor. The electronic device 102 may use the inclinometer to measure angles of slope (or tilt), elevation, or depression of the camera 108. The electronic device 102 may measure both inclines and declines using three different units of measure: degrees, percent, and topo. Using this data, the electronic device 102 may identify whether the camera 108 is facing the vehicle 106. The electronic device 102 and/or the server 110 may combine data gathered by multiple sensors to identify whether the camera 108 is indeed facing the vehicle 106.

The direction sensors may be positioned in different places within the electronic device 102. Each direction sensor may have a capability to detect the direction in which the camera 108 moves and generate different types of the direction data associated with different detected directions of different components in various data formats. In one embodiment, the direction sensors may be positioned within the electronic device 102 such that the direction sensors may be directly associated with the camera 108 of the electronic device 102. In another embodiment, the direction sensors may be positioned within the electronic device 102 such that the direction sensors may be indirectly associated with the camera 108 of the electronic device 102. In yet another embodiment, the direction sensors may be an integral part of the camera 108 of the electronic device 102. Each direction sensor within the electronic device 102 may include a sensor processor, a sensor memory, and a communications component. In some embodiments, a plurality of direction sensors may share the sensor processor, the sensor memory, the microphone, and the communication component.

The electronic device 102 may include the augmented reality application associated with the visual inspection application sub-system 104 to perform the various product inspection tasks described herein. The augmented reality application may be the visual inspection software application. The visual inspection software application may be associated with the camera 108 of the electronic device 102. The visual inspection software application may be associated with the sensors, such as the direction sensors and location sensors of the electronic device 102. The visual inspection software application may be in communication with the database 114, which may be configured for storing information used by the visual inspection software application while performing the product inspection tasks described herein. The database 114 may include a dataset of reference images and captured images associated with a unique identification number of the vehicle 106. The database 114 may further include information about features associated with the different elements of the vehicle 106 present in each reference image of the vehicle 106. The information may include geometric shape and size of each element of the vehicle 106 present in each reference image of the vehicle 106. The visual inspection software application may have access to all the captured images and the reference images of the vehicle 106 in the database 114.

The visual inspection software application may be a software stack running on the operating system of the electronic device 102. The visual inspection software application may have a protocol layer and a user interface layer where each layer may be responsible for specific functions. The protocol layer may communicate with the operating system of the electronic device 102 and manages various connections of the electronic device 102 over the communication network 116. The protocol layer may communicate with the user interface layer. The protocol layer may also be arranged to control the user interface layer to present augmented reality information to the user via a user interface of the visual inspection software application, and to receive information from the user via the user interface of the visual inspection software application.

The electronic device 102 may run a web browser. The web browser may access and present a visual inspection web application on the display screen of the electronic device 102. The processor of the electronic device 102 may execute the visual inspection web application. The user may use features of the visual inspection web application to complete an interactive and remote vehicle inspection process of the vehicle 106.

When the electronic device 102 executes the visual inspection software application running on its operating system, the visual inspection software application may communicate with a processor of the vehicle 106 over the network 116. The electronic device 102 via the visual inspection software application may establish an electronic communication session with the processor of the vehicle 106. During the electronic communication session, the processor of the vehicle 106 may transmit the unique identifier of the vehicle 106 to the electronic device 102.

On receiving the unique identifier of the vehicle 106, the visual inspection software application may initiate a remove vehicle inspection process. The visual inspection software application may transmit a request to the direction sensors of the electronic device 102 to receive the sensor data. The visual inspection software application may receive the sensor data from the direction sensors. The sensor data may include information associated with the direction and the orientation of the camera 108 of the electronic device 102 with respect to the vehicle 106. The visual inspection software application may process and analyze the sensor data. When the analysis of the sensor data confirms that, the vehicle 106 is in a direct field of view of the camera 108 and there is no other automobile present within the field of view of the camera 108, the visual inspection software application may activate the camera 108. The camera 108 may capture one or more images and videos of the vehicle 106. The camera 108 may transmit captured images and videos of the vehicle 106 to the visual inspection software application.

The visual inspection software application may process and validate the captured images and videos of the vehicle 106 received from the camera 108. To process and validate the captured images and videos of the vehicle 106, the visual inspection software application may query the direction sensor and determine whether the camera 108 was directed directly towards the vehicle 106 when the camera 108 was used to take the images and the videos of the vehicle 106. The visual inspection software application may also query a location sensor and determine whether the electronic device 102 was within a predetermined distance from the vehicle 106 when the camera 108 was used to take the images and the videos of the vehicle 106. When the visual inspection software application authenticates that the camera 108 was directed directly towards the vehicle 106 and the electronic device 102 was within the predetermined distance from the vehicle 106 when the camera 108 was used to take the images and the videos of the vehicle 106, the visual inspection software application may validate the captured images and videos of the vehicle 106 received from the camera 108.

After validation of the captured images and videos of the vehicle 106, the visual inspection software application may reject some of the captured images and video for further processing. The visual inspection software application may display instructions for the user on the display screen. The instructions may include a message for the user requesting the user to switch on an element (for example, a headlight) prior to capturing an image of the headlight. The user may switch on the headlight. The camera 108 may capture new images of the headlight when the headlight is switched on. The camera 108 may transmit the new images of the headlight to the visual inspection software application. The visual inspection software application may validate the new images of the headlight received from the camera 108.

The visual inspection software application may present the captured images and the videos of the vehicle 106 on the display screen of the electronic device 102. Simultaneously, the visual inspection software application may transmit the captured images and the videos of the vehicle 106 to the server 110 for further processing. The visual inspection software application may transmit the unique identifier of the vehicle 106 along with the captured images and the videos of the vehicle 106 to the server 110.

A server 110 is a computing device comprising a processor, and capable of performing various tasks and processes described herein. Non-limiting examples of the server 110 may include a server computer, a desktop computer, a laptop computer, a tablet computer, or any other telecommunications or computing device used to interact with various web application services and computer software applications. For ease of explanation, FIG. 1 shows a single computing device functioning as the server 110, however, it should be appreciated that some embodiments may include a number of servers capable of performing the various remote product inspection tasks described herein.

The server 110 may host computer files associated with the augmented reality application. The augmented reality application may be the visual inspection software application or the visual inspection website. The server 110 may execute software programs configured to host the augmented reality application (e.g., Apache®, Microsoft IIS®), which may generate and serve various visual inspection software application webpages on the electronic device 102. The visual inspection software application may be used to access the data stored in the database 114 and generate vehicle inspection reports for the user. The database 114 may include the reference images associated with various elements of the vehicle 106, images associated with the graphical elements and graphical components, and the captured images of the vehicle 106 received from the electronic device 102.

The server 110 may require user authentication to access the visual inspection software application on the electronic device 102 based upon a set of user authorization credentials (e.g., username, password, biometrics, cryptographic certificate). In such implementations, the server 110 may access the database 114 configured to store user credentials, which the server 110 may reference to determine whether a set of entered credentials entered in the electronic device 102 purportedly authenticating the user match an appropriate set of credentials that identify and authenticate the user. Similarly, in some implementations, the server 110 may generate and serve webpages of the visual inspection software application to the electronic device 102 based upon a role of the user. The role maybe associated with an ownership of the vehicle 106. In such implementations, the role of the user may be defined by data fields in user records stored in the database 114, and authentication of the user and the role of the user may be conducted by the server 110 by executing an access directory protocol. The server 110 may be instructed to generate webpage content of the visual inspection software application, access the data stored in the database 114, according to the role of the user defined by the user record in the database 114.

The server 110 may be configured to receive the unique identifier of the vehicle 106 from the electronic device 102 via the visual inspection software application. The server 110 may query the database 114 using the unique identifier of the vehicle 106. The server 110 may retrieve a set of reference images associated with the unique identifier of the vehicle 106 from the database 114. The server 110 may retrieve feature information associated with the different elements of the vehicle 106 present in each reference image of the vehicle 106. The feature information may be about geometric shape and size of each element of the vehicle 106 present in each reference image of the vehicle 106.

The server 110 may be configured to receive image data from the electronic device 102 via the visual inspection software application. The image data may include the captured images and videos of the vehicle 106. The server 110 may execute various algorithms on the image data. The various algorithms may include one or more image processing algorithms, one or more element detection algorithms, and one or more element recognition algorithms. Initially, the server 110 may execute the one or more image processing algorithms on the image data to process the image data. The server 110 may then execute the one or more element detection algorithms and one or more element recognition algorithms on processed image data.

The server 110 may execute the image processing algorithms on the image data to process the image data. The image processing algorithms may be computer programs. The application of the image processing algorithms on the image data may cause editing of the captured images and videos of the vehicle 106 to alter shape or size of the captured images and videos of the vehicle 106. The application of the image processing algorithms on the image data may further cause image restoration. The image restoration may refer to the estimation of clean original images out of the corrupt captured images and videos of the vehicle 106 taken in order to get back the information lost in the corrupt captured images and videos of the vehicle 106. The application of the image processing algorithms on the image data may further cause anisotropic diffusion on the image data. The anisotropic diffusion may reduce image noise in the captured images and videos of the vehicle 106 without having to remove important parts of the captured images and videos of the vehicle 106. The application of the image processing algorithms on the image data may further cause linear filtering on the image data. The linear processing of the image data may enable processing of time-varying input signals in the captured images of the vehicle 106 and producing output signals that are subject to the constraint of linearity. The application of the image processing algorithms on the image data may obtain partial differential equations on the image data by effectively de-noising the captured images and videos of the vehicle 106. Upon the execution of the image processing algorithms on the image data, the server 110 may generate the processed image data. The processed image data may include processed captured images and/or videos of the vehicle 106.

The server 110 may execute the element detection algorithms and the element recognition algorithms on the processed image data. The processed image data may include processed captured images. Each processed captured image of the vehicle 106 may be a representation of a plurality of pixels. The element detection algorithms and the element recognition algorithms may be machine-learning algorithms, which are trained using a training dataset. The application of the element detection algorithms and the element recognition algorithms on the image data may result in extraction of unique characteristics and features associated with various elements of the vehicle 106 in the processed image data. The application of the element detection algorithms and the element recognition algorithms on the image data may also result in analysis of pixels in the captured images and/or videos of the vehicle 106. The server 110 may enable at least some of the plurality of pixels to represent various elements of the vehicle 106. The server 110 may process extracted characteristics, extracted features, and pixel information to identify each element of the vehicle 106 within the captured images and/or videos of the vehicle 106. The server 110 may also process the extracted characteristics, the extracted features, and the pixel information to determine location of each element of the vehicle 106 within the captured images and/or videos of the vehicle 106. The server 110 may generate a record associated with each element identified in the captured images and/or videos of the vehicle 106. The server 110 may store the record associated with each element identified in the captured images and/or videos of the vehicle 106 in the database 114.

The server 110 may execute a comparison algorithm to compare current information associated with each element (for example, a right side taillight) identified in the captured images and/or videos of the vehicle 106 with reference information associated with same corresponding element (for example, the right side taillight) in the reference images and/or videos of the vehicle 106. The current information associated with each element may include a current list of attributes associated with each element. The current list of attributes may include marks, color, shape, size, etc. The reference information associated with each element may include a reference list of attributes associated with each element. The reference list of attributes may include marks, color, shape, size, etc.

When all the current list of attributes associated with a first element (for example, the right side taillight) identified in the captured images and/or videos of the vehicle 106 matches with the reference list of attributes associated with same corresponding element (for example, the right side taillight), the server 110 may determine that the first element has passed an inspection. However, when all the current list of attributes associated with the first element (for example, the right side taillight) identified in the captured images and/or videos of the vehicle 106 does not match with the reference list of attributes associated with same corresponding element (for example, the right side taillight), the server 110 may determine that the first element has failed the inspection.

The server 110 may determine whether a second element (for example, a front headlight of the vehicle 106) has passed or failed the inspection based on evaluation of only some of the attributes associated with the second element. For instance, when a predetermined number of the current list of attributes associated with the second element identified in the captured images and/or videos of the vehicle 106 matches with the reference list of attributes associated with same corresponding second element, the server 110 may determine that the second element has passed an inspection. However, when the predetermined number of the current list of attributes associated with the second element identified in the captured images and/or videos of the vehicle 106 does not match with the reference list of attributes associated with same corresponding second element, the server 110 may determine that the second element has failed the inspection. In one non-limiting example, a total number of the current list of attributes associated with the second element may be five. The predetermined threshold number may be three. The server 110 may confirm that the second element has passed the inspection when at least three current attributes of the second element match with the reference attributes of the second element.

The server 110 may generate a computer image or a composite image after inspecting each element present within the captured images and/or videos of the vehicle 106. The composite image may include a graphical indicator. The graphical indicator may be a check mark symbol (√). The graphical indicator may be a cross mark symbol (X). The server 110 may place the composite image on top of the captured images or the videos presented on the display screen of the electronic device 102.

When the server 110 determines that the first element has passed the inspection, the server 110 may generate a first composite image. The first composite image may include a first graphical indicator. The first graphical indicator may be the check mark symbol (√). The check mark symbol may visually indicate to the user that the first element has passed the inspection. The server 110 may overlay the first composite image adjacent to the first element shown in the captured image of the vehicle 106 presented on the display screen of the electronic device 102. The server 110 may stitch the first composite image and the captured image data together to create the augmented reality including visual data, audio data, or other types of data in real time on the display screen of the electronic device 102, as the user is viewing the vehicle 106 via the visual inspection software application. The data may be stitched together using various techniques, such as scale-invariant feature transform registration technique to combine the data of both images.

The first composite image may be disposed within a field of view of the user. The first composite image may visually distinguish the first graphical indicator from all other elements of the vehicle in the captured image of the vehicle 106 presented on the display screen of the electronic device 102. The first graphical indicator may be in control of the user such that a manipulation of the first graphical indicator is intended to be communicative of user instructions. The user may interact with the first graphical indicator through hand gestures, tool gestures, or voice commands. In response to the interaction with the first graphical indicator, a first message may pop up on the display screen. The first message may include a text memo. The text memo may include information associated a name and a current status of the inspection of the first element. The text memo may further include information associated a date, a time, and a location of the inspection of the first element.

When the server 110 determines that the second element has failed the inspection, the server 110 may generate a second composite image. The second composite image may include a second graphical indicator. The second graphical indicator may be the cross mark symbol (X). The cross mark symbol may visually indicate to the user that the second element has failed the inspection. The server 110 may overlay the second composite image adjacent to the second element shown in the captured image of the vehicle 106 presented on the display screen of the electronic device 102. The server 110 may stitch the second composite image and the captured image data together to create the augmented reality including visual data, audio data, or other types of data in real time on the display screen of the electronic device 102, as the user is viewing the vehicle 106 via the visual inspection software application. The data may be stitched together using various techniques, such as the scale-invariant feature transform registration technique to combine the data of both images.

The second composite image may be disposed within the field of view of the user. The second composite image may visually distinguish the second graphical indicator from all other elements of the vehicle in the captured image of the vehicle 106 presented on the display screen of the electronic device 102. The second graphical indicator may be in control of the user such that a manipulation of the second graphical indicator is intended to be communicative of user instructions. The user may interact with the second graphical indicator through hand gestures, tool gestures, or voice commands. In response to the interaction with the second graphical indicator, a second message may pop up on the display screen. The second message may include a text memo. The text memo may include information associated a name and a current status of the inspection of the second element. The text memo may further include information associated a date, a time, and a location of the inspection of the second element.

The server 110 may generate a first graphical component when the inspection of all elements of the vehicle 106 is completed. The first graphical component may be associated with a completion of the inspection of all elements of the vehicle 106. The server 110 may present the first graphical component on the display screen of the electronic device 102. The first graphical component may be in control of the user such that a manipulation of the first graphical component is intended to be communicative of user instructions. The user may interact with the first graphical component through hand gestures, tool gestures, or voice commands. In response to the interaction with the first graphical component, a third message may pop up on the display screen. The third message may include a text memo. The text memo may include information associated a name and a current status of the inspection of all elements. The text memo may further include information associated a date, a time, and a location of the inspection of all elements.

The server 110 may generate a second graphical component when the inspection of all elements of the vehicle 106 is successful. The server 110 may determine that the inspection of the vehicle 106 is successful when at least a predetermined number of elements of the vehicle 106 has passed the inspection. The second graphical component may be associated with a successful inspection of the vehicle 106. The server 110 may present the second graphical component on the display screen of the electronic device 102. The second graphical component may be in control of the user such that a manipulation of the second graphical component is intended to be communicative of user instructions. The user may interact with the second graphical component through hand gestures, tool gestures, or voice commands. In response to the interaction with the second graphical component, a fourth message may pop up on the display screen. The fourth message may include a text memo. The text memo may include a web link to download a vehicle inspection report. The text memo may further include an inspection letter. The inspection letter may include a name and a total number of non-faulty elements of the vehicle 106. The inspection message may further include a name and a total number of faulty elements of the vehicle 106.

A database 114 may be hosted on the electronic device 102 or the server 110. The database 114 may be in communication with a processor of the electronic device 102 or the server 110 where the processor is capable of executing the various commands of a database management system. The database 114 may be part of the electronic device 102 or the server 110. The database 114 may be a separate component in communication with the electronic device 102 or the server 110.

The database 114 may be capable of storing data, such as device identification data, vehicle identification data, and user identification data in a plaintext format and/or an encrypted version. The device identification data may include information associated with a size of a display screen of the electronic device 102, a type of the display screen, a resolution of the display screen, a type of the electronic device 102, a camera of the electronic device 102, transmitters of the electronic device 102, receivers of the electronic device 102, and sensors of the electronic device 102. The user identification data may include information associated with the user, such as a list of vehicles associated with the user. The vehicle identification data may include information associated with the vehicle 106, such as a registration number of the vehicle 106 and a number of elements of the vehicle 106.

The database 114 may include a non-transitory machine-readable storage media capable of exchanging, receiving, storing, updating, and/or querying data records stored among them. The database 114 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and management functions generated by the server 110 and/or the electronic device 102.

FIGS. 2A-2E shows a graphical user interface 202 of an electronic device 200 displaying a visual inspection software application. The graphical user interface 202 may also be called as a display screen. The visual inspection software application is an augmented reality application based on augmented reality technology. The electronic device 200 is a mobile device, however, it should be appreciated that some embodiments may include any different electronic device capable of performing various product inspection tasks described herein. For example, the electronic device 200 may be a display device in form of glasses, goggles, or any other structure that supports and incorporates various components of the electronic device 200, as well as serves as a conduit for electrical and other component connections. The electronic device 200 may include a software product associated with a camera, for example, the visual inspection software application executing on the mobile device enabled with the camera. The electronic device 200 may further include processors, transmitters, receivers, cameras, sensors, and input devices. The sensors may be directional sensors, positional sensors, and MEMS sensors making the sensors suitable for augmented reality platforms. The MEMS sensors may include accelerometers, global positioning system, and solid-state compass.

The graphical user interface 202 may include one or more of display components, such as a cathode ray tube, a liquid crystal display, an OLED display, an AMOLED display, a super-AMOLED display, a plasma display, an incandescent light, a fluorescent light, a front or rear projection display, or a light emitting diode indicator. The graphical user interface 202 may further include an imaging system, which may be implemented with a number of micro display panels, lenses, and reflecting elements to display and project an image. The display panels, lenses, and reflecting elements of the imaging system may be implemented with various display technologies, such as implemented with a transparent LCD, or using a projection technology. The projection technology may be implemented using LCD type displays with powerful backlights and high optical energy densities. Alternatively, a micro display and/or reflecting element may be implemented using a reflective technology, such as digital light processing and liquid crystal on silicon that reflects external light, which is reflected and modulated by an optical material.

The graphical user interface 202 may be connected to a processor of the electronic device 200 for entering data and commands in a form of text, touch input, gestures, etc. The graphical user interface 202 may be a touch screen device, but may alternatively be a proximity detector, a sensor, or any input/output device combination capable of sensing gestures and/or touches including a touch-sensitive surface. In addition, the graphical user interface 202 may include components, such as a video input component (for example, a camera or an optical sensor), an audio input component (for example, a microphone), a mechanical input component (for example, a button selection sensor, a key selection sensor, a touch pad sensor, a touch-sensitive sensor, a motion sensor), and a pointing device (for example, a joystick, a touch pad, a touch screen, a fingerprint sensor, and a pad for an electronic stylus).

In operation, the user may use the electronic device 200 for viewing and inspecting elements, such as headlight and side view mirror of a vehicle 201 via the visual inspection software application. The electronic device 200 may employ one or more cameras to intercept a real world view of the vehicle 201, and re-display an augmented view of the vehicle 201 through the graphical user interface 202 in which the augmented reality imagery is projected through or reflected off the surfaces of the graphical user interface 202. The augmented reality imagery may include a status of inspection of each element of the vehicle 201.

As depicted in the FIG. 2A, a computer image of a first graphical component 212 is presented on the graphical user interface 202. The first graphical component 212 is presented when verification of an identity of the vehicle 201 is ongoing. The first graphical component 212 may indicate instructions for the user. The instructions may prompt the user to match a taillight layout 214 with a corresponding taillight of the vehicle 201. The user may use the electronic device 200 from a particular position and a particular direction relative to the vehicle to match the taillight layout 214 with the corresponding taillight of the vehicle 201. When the corresponding taillight of the vehicle 201 matches the taillight layout 214, the verification of the identity of the vehicle 201 is completed.

As will be described below, the server may display the first graphical component 212 to ensure that the image captured by the electronic device 200 can be compared to references images retrieved. By visually aligning the taillight of the vehicle 201 with the taillight layout 214, the user ensure that the image captured from the vehicle 201 matches (in size, angle, and the like) with the reference image captured. As a result, the server can efficiently compare the captured image with the reference image.

Figure 2B:
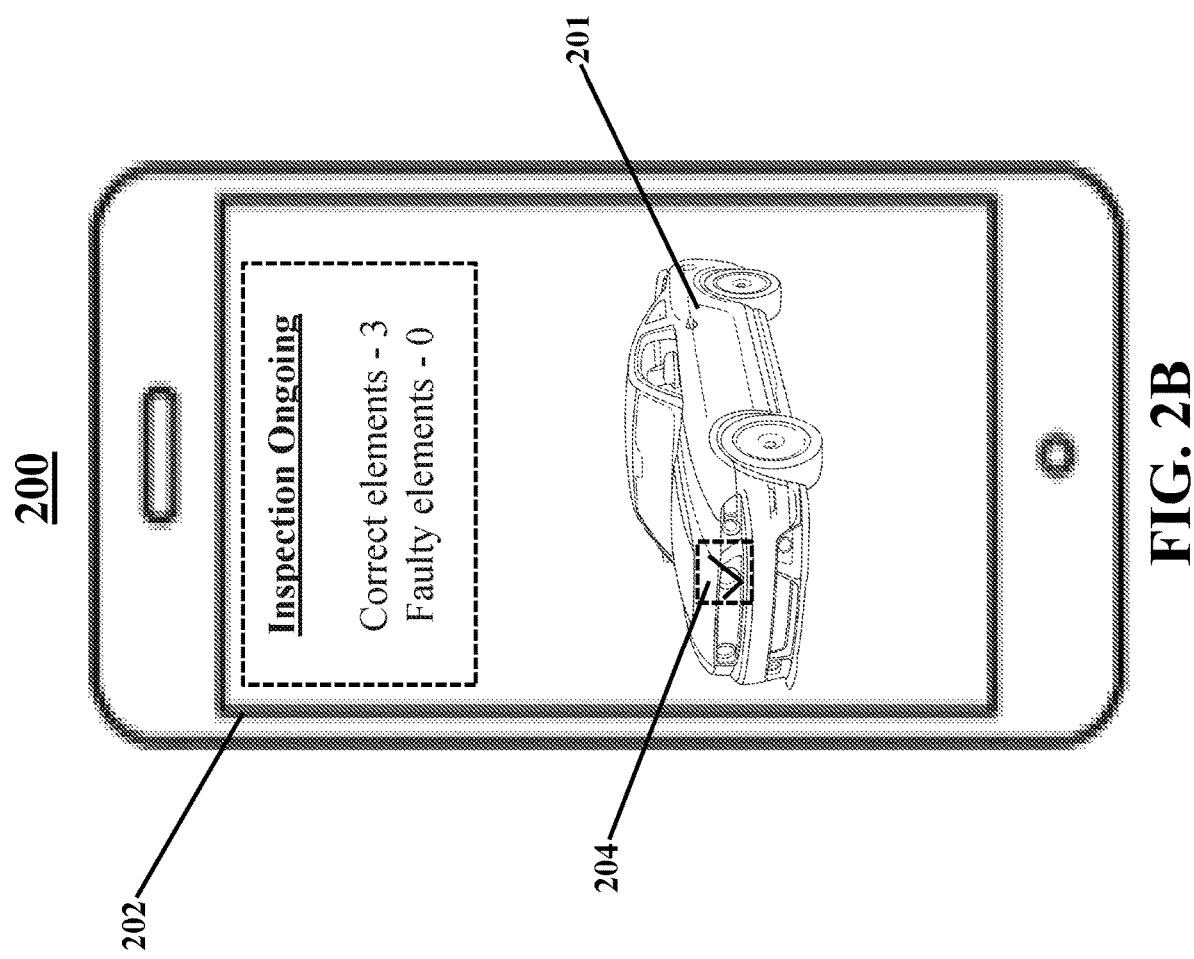
FIG. 2B shows a graphical user interface of an electronic device displaying a visual inspection software application, according to an embodiment.

As depicted in the FIG. 2B, a computer image of a first graphical indicator 204 is superimposed on a headlight of the vehicle 201. The first graphical indicator 204 is a check mark symbol (√). The check mark symbol may visually indicate to the user that the headlight has passed the inspection.

Figure 2C:
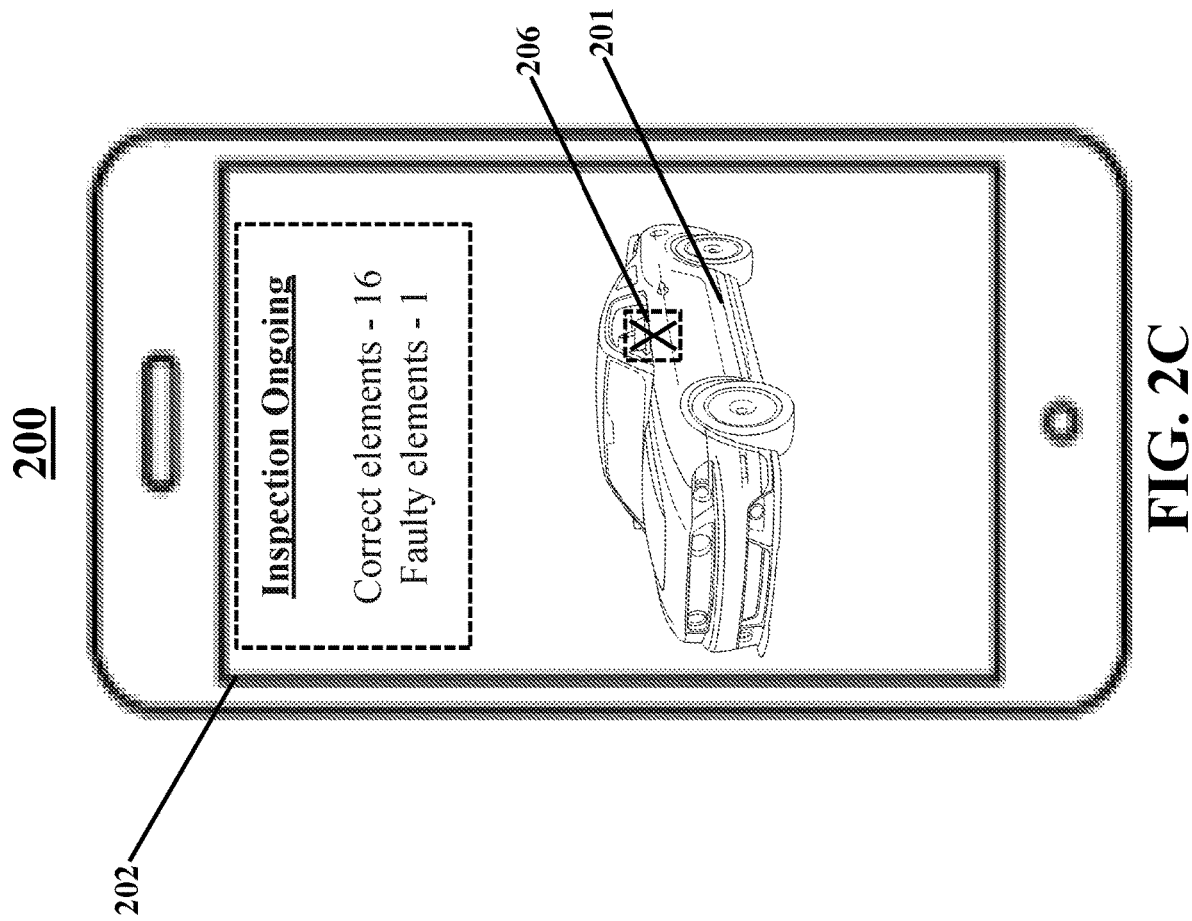
FIG. 2C shows a graphical user interface of an electronic device displaying a visual inspection software application, according to an embodiment.

As depicted in the FIG. 2C, a computer image of a second graphical indicator 206 is superimposed on a side view mirror of the vehicle 201. The second graphical indicator 206 is a cross mark symbol (X). The cross mark symbol may visually indicate to the user that the side view mirror has failed the inspection.

Figure 2D:
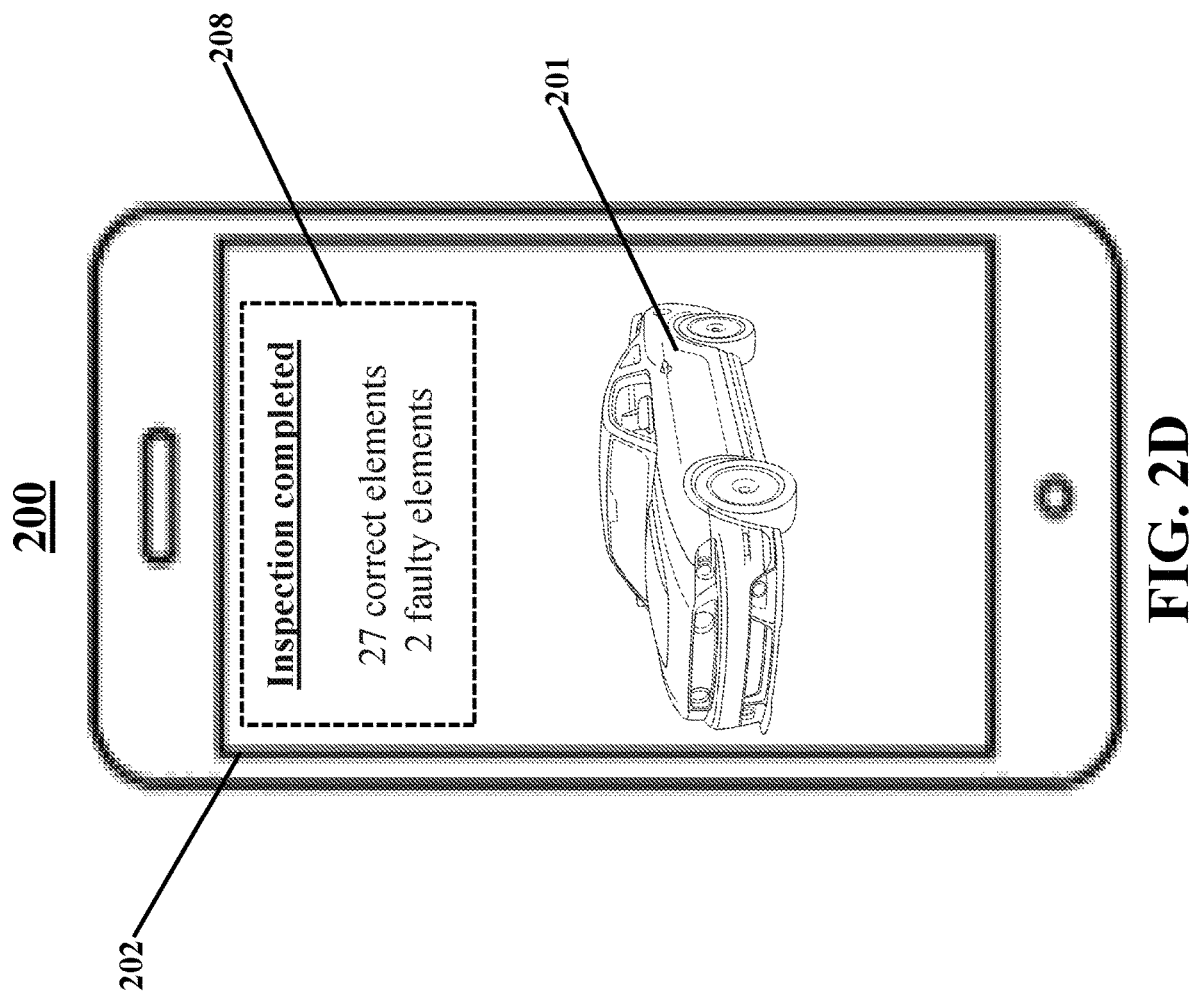
FIG. 2D shows a graphical user interface of an electronic device displaying a visual inspection software application, according to an embodiment.

As depicted in the FIG. 2D, a computer image of a second graphical component 208 is presented on the graphical user interface 202. The second graphical component 208 is presented upon the completion of the inspection of all elements of the vehicle 201. The second graphical component 208 may indicate information associated with a name and a total number of non-faulty or correct elements of the vehicle 201. The second graphical component 208 may further indicate the information associated with a name and a total number of faulty elements of the vehicle 201.

Figure 2E:
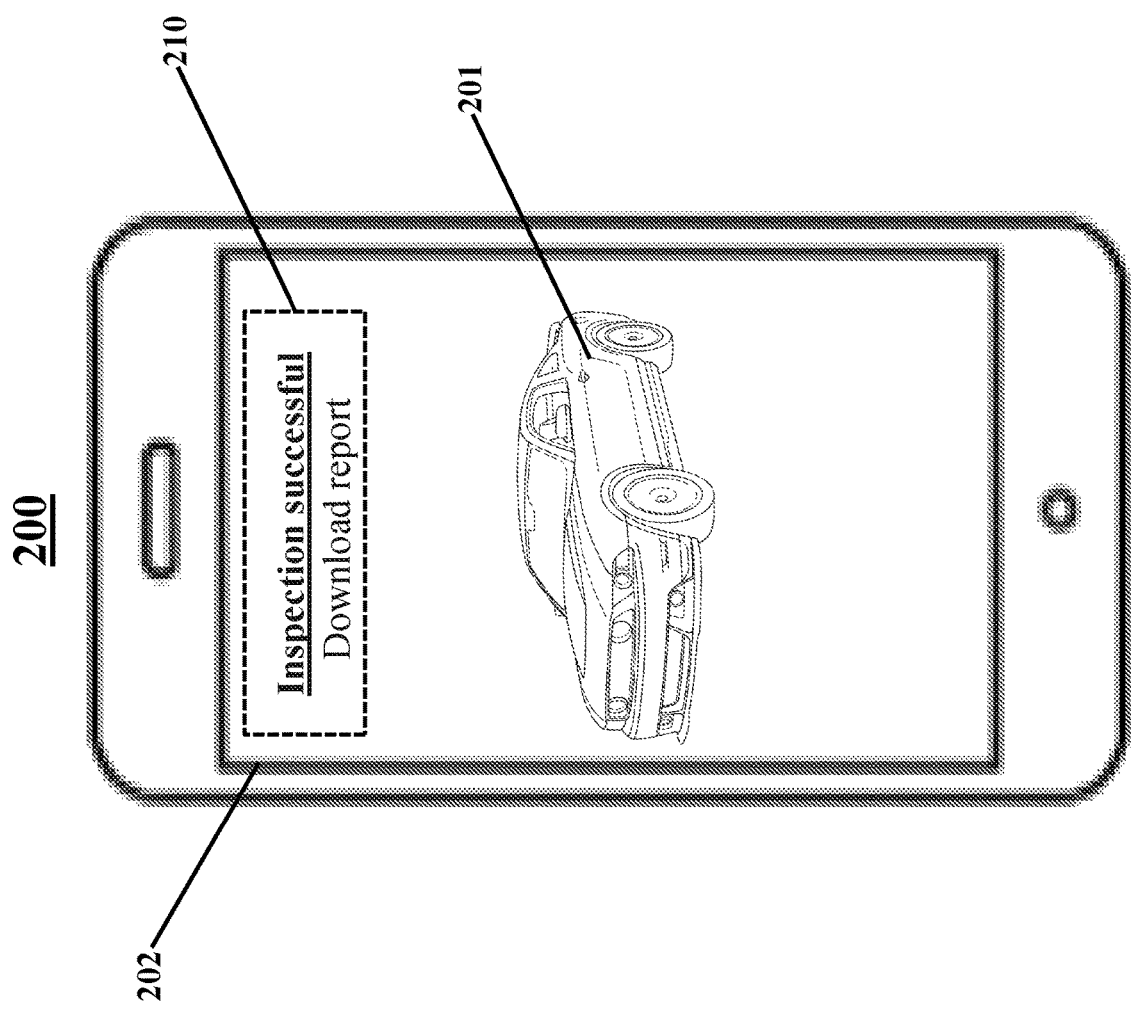
FIG. 2E shows a graphical user interface of an electronic device displaying a visual inspection software application, according to an embodiment.

As depicted in the FIG. 2E, a computer image of a third graphical component 210 is presented on the graphical user interface 202. The third graphical component 210 may be presented upon the successful inspection of all elements of the vehicle 201. The third graphical component 210 may include a web link to download a vehicle inspection report.

Figure 3:
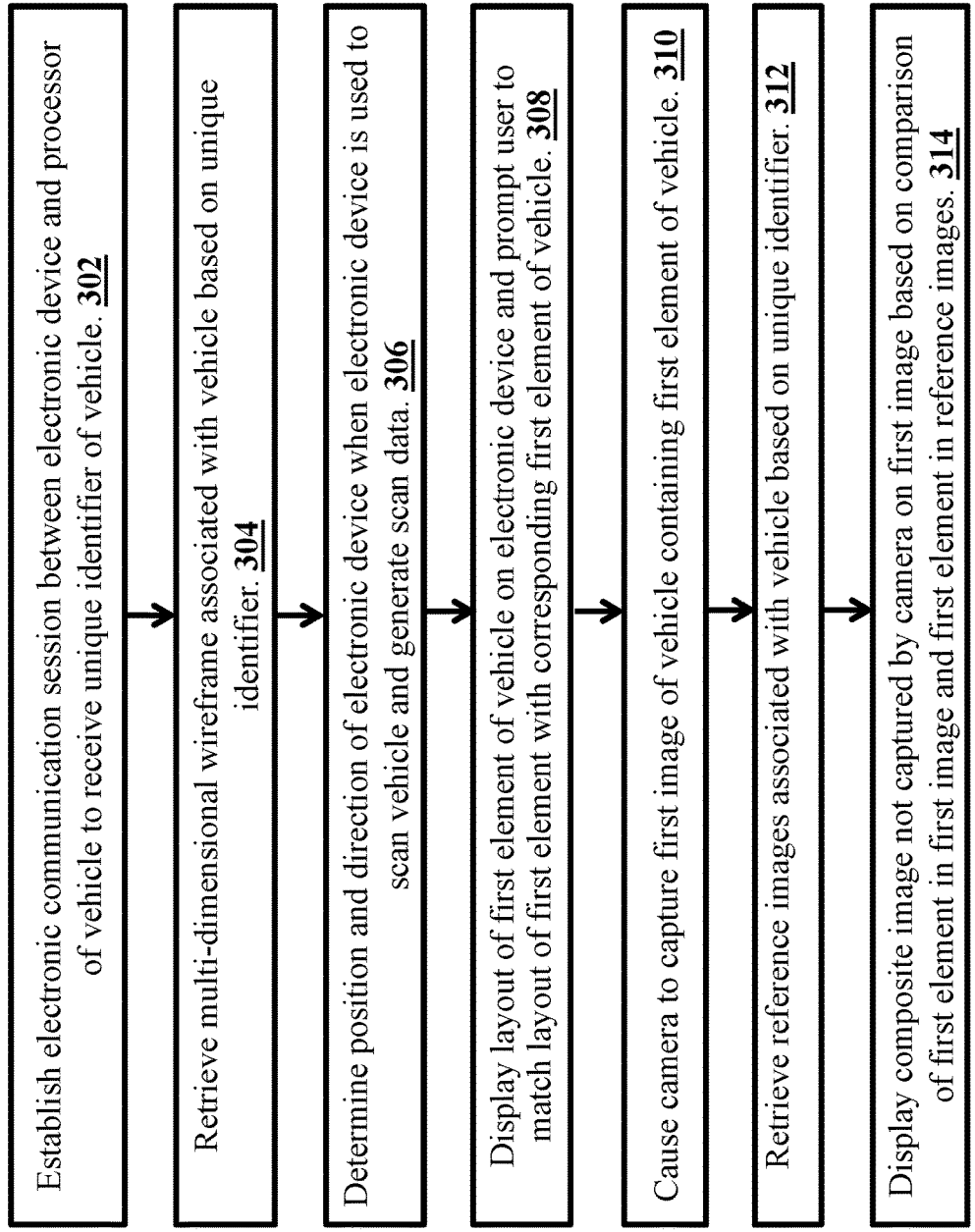
FIG. 3 shows execution of a method corresponding to operations of a product inspection system, according to an embodiment.

FIG. 3 shows execution of a method corresponding to operations of a vehicle inspection system, according to a method 300. The method 300 shown in FIG. 3 comprises execution steps 302, 304, 306, 308, 310, 312, and 314. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 300 of FIG. 3 is described as being executed by a single server computer, referred to as a system server in this embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as an electronic device or a server described herein.

In step 302, a server may be in communication with an electronic device of a user and a processor of a vehicle. The electronic device may execute a visual inspection software application. The server, the vehicle, and the electronic device may be associated with communication components, transmitters, and receivers. The server may continuously monitor a distance between the electronic device and the vehicle. When the electronic device is within a predetermined distance from the vehicle, the server or any other device may transmit a request to the electronic device and/or the processor of the vehicle for a wireless connection.

In one example, a transmitter positioned within the vehicle and associated with the server may first identify a receiver of the electronic device when the electronic device is within the predetermined distance from the vehicle, and then transmit a request for the wireless connection to the receiver of the electronic device. In another example, a transmitter of the electronic device may transmit a request for the wireless connection to a receiver associated with the vehicle when the electronic device is within the predetermined distance from the vehicle. The transmitter and the receiver of the electronic device and the vehicle may communicate to each other with or without communication components. The communications component may include electromechanical components (e.g., processor, antenna) that allow the communications component to communicate various types of data with the receivers and the transmitters of the electronic device and the vehicle. In some implementations, communications signals between the transmitter and the receiver of the electronic device and the vehicle may represent a distinct channel for hosting communications. The data may be communicated using the communications signals, based on predetermined wired or wireless protocols and associated hardware and software technology. The communications component may operate based on any number of communication protocols, such as Bluetooth®, Wireless Fidelity (Wi-Fi), Near-Field Communications (NFC), Zig-Bee, and others.

When the wireless connection is established, the electronic device, the processor of the vehicle, and the server may communicate with each other over a wireless network. The server may establish an electronic communication session between the electronic device and the processor of the vehicle. During the electronic communication session, the server may receive a unique identifier of the vehicle and the electronic device.

In a next step 304, a server may retrieve a multi-dimensional wireframe associated with the vehicle from a database based on the unique identifier of the vehicle. The multi-dimensional wireframe may include a three-dimensional model. The three-dimensional model may include a layout of the vehicle. The layout may be a visual schematic, which may include information hierarchy of the vehicle represented by various lines and vertices.

A multi-dimensional wireframe may be a machine-readable visual representation of a 3-dimensional (3D) or physical object (e.g., vehicle). A server (such as the server 110 in FIG. 1) may have previously generated the multi-dimensional wireframe of multiple vehicles using machine-readable description of each edge of the physical object where two mathematically continuous smooth surfaces meet, or by connecting an object's constituent vertices using straight lines or curves that correspond to the object.

Additionally or alternatively, the server may receive one or more attributes associated with the vehicle. For instance, the user may interact with a prompt having various input fields to input a make/model (or any other identifying attribute) of the vehicle. The server may then retrieve the multi-dimensional wireframe associated with the vehicle from an electronic data source.

In a next step 306, a server may communicate with a direction sensor. In one embodiment, the direction sensor may be directly or indirectly associated with the electronic device. In another embodiment, the direction sensor may be directly or indirectly associated with the vehicle. In yet another embodiment, a plurality of direction sensors may be directly or indirectly associated with both the vehicle and the electronic device.

When the user uses a camera of the electronic device to scan the vehicle by the moving around the vehicle, the electronic device may generate scan data. The camera may be associated with the visual inspection software application. The scan data may include candidate images or video of the vehicle. When the user is using the camera of the electronic device to scan the vehicle, the direction sensor may monitor a position and a direction of the electronic device relative to the vehicle. The direction sensor may record direction data associated with the position and the direction of the electronic device relative to the vehicle in the database. The electronic device may communicate with the direction sensor to obtain the direction data.

By first scanning the vehicle, the server identifies a relative position and angle of the electronic device relative to the vehicle. For instance, the server may prompt the user to move around the vehicle or move the electronic device such that the camera is facing various angles where the vehicle is visible. The server may continuously monitor the stream of images captures (in real time) and may use the retrieved multi-dimensional wireframe to identify the position and direction of the electronic device. In this way, once the server identifies the vehicle and the electronic device's relative positons, the server ensures that the images captured from the vehicle (steps 310-312) are indeed from the vehicle and not another object (e.g., another vehicle parked nearby).

Using augmented reality features, the server identifies the vehicle's wireframe and position. Therefore, the server may only accept images that are consistent with the identified location of the vehicle and consistent with the electronic device's relative position and direction. As a result, the server can determines whether the camera is facing in a direction other than the direction consistent with the identified and mapped vehicle. In some configurations, the server will only continue accepting images consistent with the mapped/scanned vehicle until the inspection is terminated. In this way, the server reduces the possibility of fraudulent activities.

When the server identifies that a direction of the camera is inconsistent with the scanned images (e.g., the user is scanning a different vehicle near the vehicle that should be scanned and verified), the server may display a prompt identifying the user to correct the direction of the camera.

In a next step 308, a server may match the scanned data associated with the vehicle with the multi-dimensional wireframe of with the vehicle. When the above-described mapping is complete, the server may prompt the user to initiate visual inspection of the vehicle. In some configurations, the server may use the mapping/scanning step to also authenticate the vehicle. For instance, the multi-dimensional wireframe of the vehicle must match the scanned data received from the electronic device. The server may only proceed if the vehicle is authenticated. For instance, when the scan data associated with the vehicle matches with the information contained in the multi-dimensional wireframe associated with the vehicle, the server may authenticate an identity of the vehicle. The server may also generate an authentication message and transmit the authentication message to the electronic device. The authentication message may be displayed on the display screen of the electronic device via the visual inspection software application.

The server may generate a layout of a first element of the vehicle. The server may access information associated with the vehicle stored in the database to generate the layout of the first element of the vehicle. The server may present the layout of the first element of the vehicle on the display screen of the electronic device via the visual inspection software application. The server may also present a request on the display screen of the electronic device via the visual inspection software application. The request may prompt the user to execute a layout matching process by aligning the layout of the first element displayed on the display screen of the electronic device with a corresponding first element of the vehicle using the electronic device. The request may further indicate to the user to execute the layout matching process using the electronic device from a particular position and direction relative to the vehicle. The user may use the electronic device from the particular position and the direction relative to the vehicle to match the layout of the first element displayed on the display screen of the electronic device with the corresponding first element of the vehicle. In this way, the server can easily compare the image captured by the electronic device to the vehicle reference images retrieved.

In a next step 310, a server may determine whether the layout of the first element displayed on the display screen of the electronic device matches the corresponding first element of the vehicle. When the corresponding first element of the vehicle aligns the first element displayed on the electronic device, the server may instantly activate and initiate/instruct the camera to automatically capture a first image of the vehicle containing the first element.

In a next step 312, a server may retrieve a set of reference images associated with the vehicle from the database based on the unique identifier of the vehicle. The unique identifier of the vehicle may include a name and a model number of the vehicle. The database may include reference videos and reference images of the vehicle. The reference videos may include image frames capturing various elements, such as headlights of the vehicle. In one non-limiting example, the unique identifier of the vehicle may be Ford Focus 1995. The server may query the database and retrieve all references images and videos of the Ford Focus 1995. The reference videos and images may contain various elements, such as headlights and side view mirrors of the Ford Focus 1995.

In a next step 314, a server may compare current information associated with the first element in the first image of the vehicle with the reference images of the vehicle. For example, the server may compare the current information associated with the first element (such as, a first headlight) in the first image with reference information associated with the first element in the reference images. The current information associated with the first element may include a physical shape of the first element, a size of the first element, a color of the first element, etc. Similarly, the reference information associated with the first element may include an original physical shape of the first element, an original size of the first element, an original color of the first element, etc.

Based on the comparison, the server may determine that the current information associated with the first element is same as the reference information associated with the first element. This may imply that the first element, which is the first headlight, is in appropriate condition. The server may generate and display a first composite image not captured by the camera on the display screen of the electronic device. The first composite image may be overlaid on the first image being presented on the display screen via the visual inspection software application. This allows enrichment and augmentation of the first image with additional computer generated content, such as the first composite image, which may be presented to the user in a form of a graphical layer overlaying the real-world scenery in the augmented reality view, and as a result providing an augmented reality user-experience on their electronic device.

The server may use various methods to display the composite images onto the image of the vehicle. For instance, the server may use augmented reality methods to display the images captured by the camera in conjunction with the generated composite images. Using augmented reality display techniques the server may provide an interactive experience of a real-world environment where the objects that reside in the real world are enhanced by computer-generated perceptual information (e.g., composite images). Therefore, the server displays a combination of real and virtual images (referred to herein as the composite image).

As described herein, the server may display two sets of images (e.g., video streams and images). The set of images may correspond to images captured by the camera. Using the methods and systems described herein, the server may detect various visual attributes of the captured images and generate a composite image accordingly. For instance, when the images capture by the camera satisfy a threshold (e.g., attributes of the vehicle are satisfactory), the server may generate a composite image (e.g., green tick mark) that can be overlaid on the images captured by the camera and displayed on the display of the electronic device.

In some embodiments, the server may tether the composite image onto a feature of the vehicle. For instance, upon the user capturing images (e.g., moving the camera, such that the camera can transmit an image of a particular feature of the vehicle to the server), the server may (in real time) analyze the feature. When the server identifies that the feature is satisfactory, the server may generate and display a composite image (e.g., green tick mark) on or near the satisfactory feature. In some embodiments, the server may use augmented reality display methods, to tether the green tick mark to the particular feature of the vehicle, such that the green mark is displayed each time the camera is pointing towards that particular feature of the vehicle.

The server may use "image registration" techniques to generate a coordinate system associated with the vehicle (multi-dimensional wireframe and images of the vehicle). The server may then use "image/vide tracking" and "computer vision" techniques in conjunction with "visual odometry" techniques to determine position and orientation of images captured by the camera. The server may then use various autography techniques to generate the augmented reality composite imagery.

The first composite image may include a first graphical indicator corresponding to a status of an inspection of the first element. The first graphical indicator may include a check mark symbol. The check mark symbol may visually indicate to the user that the first element has passed an inspection. The first composite image may visually distinguish the first graphical indicator from all other elements in the first image.

The first graphical indicator may be in control of the user such that a manipulation of the first graphical indicator is intended to be communicative of user instructions. The user may interact with the first graphical indicator through hand gestures, tool gestures, or voice commands. The first graphical indicator may be selectively positioned for purposes of communicating instructions to an applications program of the visual inspection software application controlling the display screen of the electronic device, in response to the user interaction with the first graphical indicator. In response to receiving the instructions, the applications program may cause a first notification to pop up on the display screen. The first notification may include a text memo. The text memo may include a message that the first element has passed the inspection.

In another instance, based on the comparison, the server may determine that the current information associated with the first element is different from the reference information associated with the first element. This may imply that the first element, which is the first headlight, is not in the proper condition. The server may generate and display a second composite image not captured by the camera on the display screen of the electronic device. The second composite image may be overlaid on the first image, which is being presented on the display screen. This allows enrichment and augmentation of the first image with additional computer generated content, such as the second composite image, which may be presented to the user in the form of the graphical layer overlaying the real-world scenery in the augmented reality view, and as a result providing the augmented reality user-experience on their electronic device.

The second composite image may include a second graphical indicator corresponding to the status of the inspection of the first element. The second graphical indicator may be a cross mark symbol. The cross mark symbol may visually indicate to the user that the first element has failed the inspection. The second composite image may visually distinguish the second graphical indicator from all other elements in the first captured image.

The second graphical indicator may be in control of the user such that the manipulation of the second graphical indicator is intended to be communicative of user instructions. The user may interact with the second graphical indicator through hand gestures, tool gestures, or voice commands. The second graphical indicator may be selectively positioned for purposes of communicating instructions to the applications program of the visual inspection software application controlling the display screen of the electronic device, in response to the user interaction with the second graphical indicator. In response to receiving the instructions, the applications program may cause a second notification to pop up on the display screen. The second notification may include a text memo. The text memo may include a message that the first element has failed the inspection.

Figure 4:
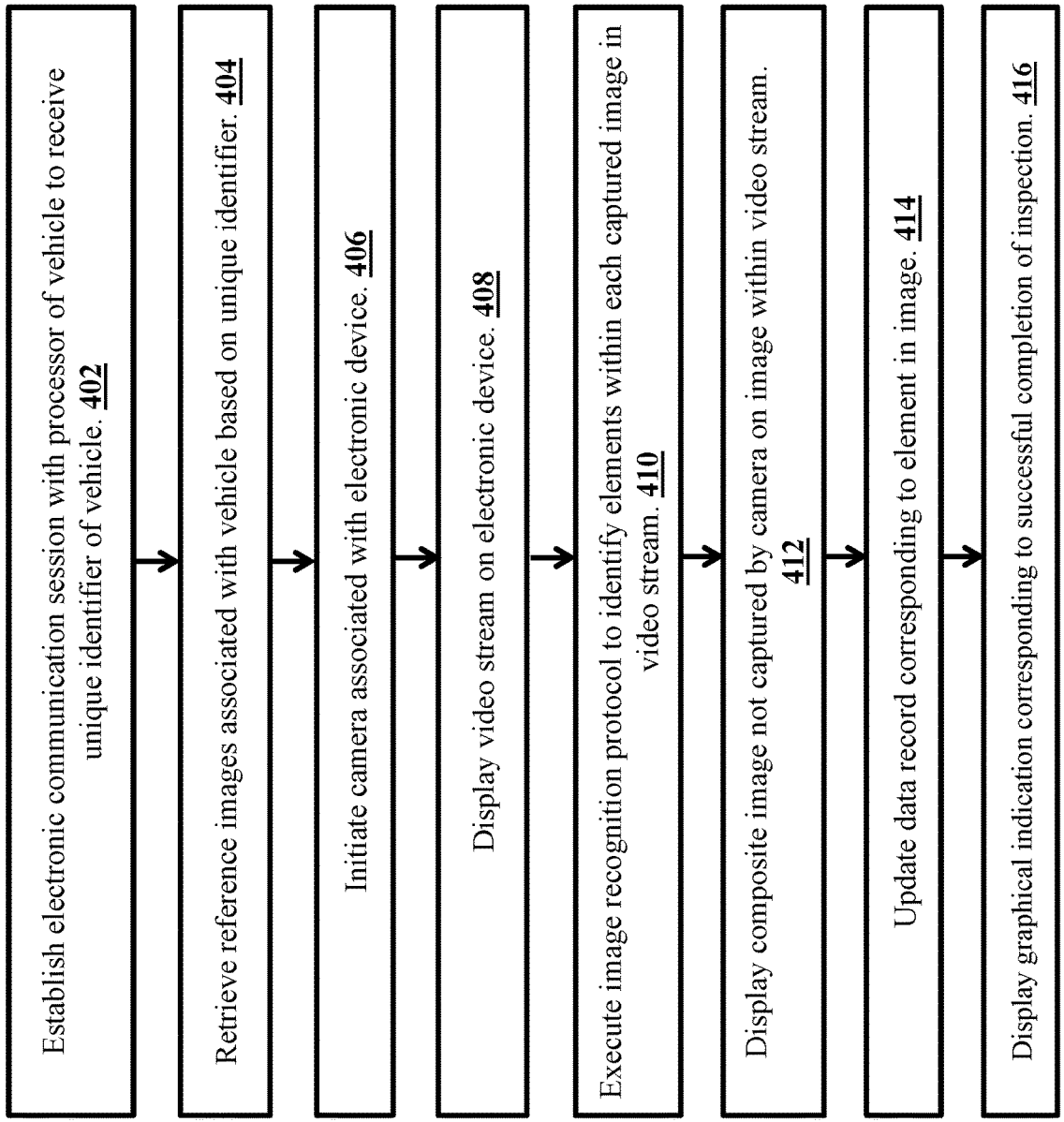
FIG. 4 shows execution of a method corresponding to operations of a product inspection system, according to an embodiment.

FIG. 4 shows execution of a method corresponding to operations of a vehicle inspection system, according to a method 400. The method 400 shown in FIG. 4 comprises execution steps 402, 404, 406, 408, 410, 412, 414, and 416. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 400 of FIG. 4 is described as being executed by a single server computer, referred to as a system server in this embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as an electronic device or a server described herein.

In a first step 402, a server may be in communication with an electronic device of a user and a processor of a vehicle. The electronic device may execute a visual inspection software application. The server, the vehicle, and the electronic device may be associated with communication components, transmitters, and receivers. The server may continuously monitor a distance between the electronic device and the vehicle. When the electronic device is within a predetermined distance from the vehicle, the server or any other device may transmit a request to the electronic device and/or the processor of the vehicle for a wireless connection with each other.

In one example, a transmitter positioned within the vehicle and associated with the server may first identify a receiver of the electronic device when the electronic device is within the predetermined distance from the vehicle, and then transmit a request for the wireless connection to the receiver of the electronic device. In another example, a transmitter of the electronic device may transmit a request for the wireless connection to a receiver associated with the vehicle when the electronic device is within the predetermined distance from the vehicle. The transmitter and the receiver of the electronic device and the vehicle may communicate to each other with or without communication components. The communications component may include electromechanical components (e.g., processor, antenna) that allow the communications component to communicate various types of data with the receivers and the transmitters of the electronic device and the vehicle. In some implementations, communications signals between the transmitter and the receiver of the electronic device and the vehicle may represent a distinct channel for hosting communications. The data may be communicated using the communications signals, based on predetermined wired or wireless protocols and associated hardware and software technology. The communications component may operate based on any number of communication protocols, such as Bluetooth®, Wireless Fidelity (Wi-Fi), Near-Field Communications (NFC), Zig-Bee, and others.

When the wireless connection is established, the electronic device, the processor of the vehicle, and the server may communicate with each other over a wireless network. The server may establish an electronic communication session between the electronic device and the processor of the vehicle. During the electronic communication session, the server may receive a unique identifier of the vehicle and the electronic device.

In a next step 404, a server may retrieve a set of reference images associated with the vehicle from a database based on the unique identifier of the vehicle. The unique identifier of the vehicle may include a name and a model number of the vehicle. The database may include reference videos and reference images of the vehicle. The reference videos may include image frames capturing various elements, such as headlights of the vehicle. In one non-limiting example, the unique identifier of the vehicle may be Ford Focus 1995. The server may query the database and retrieve all references images and videos of the Ford Focus 1995. The reference videos and images may contain various elements, such as headlights and side view mirrors of the Ford Focus 1995.

In some embodiments, the server may use a photograph of the vehicle to determine a name and a model number of the vehicle. The server may execute image-processing algorithms on the photograph to recognize the vehicle. Once the vehicle is recognized, the server may determine a model number of the vehicle. The server may then retrieve the set of reference images associated with the vehicle from the database based on the model number of the vehicle.

In a next step 406, a server may communicate with a direction sensor. In one embodiment, the direction sensor may be directly or indirectly associated with the electronic device. In another embodiment, the direction sensor may be directly or indirectly associated with the vehicle. In yet another embodiment, a plurality of direction sensors may be directly or indirectly associated with both the vehicle and the electronic device. The server may monitor a camera of the electronic device based on inputs from the direction sensor. For instance, the server may monitor the direction of the camera with respect to the vehicle based on the inputs from the direction sensor.

When the direction of the camera is facing towards the vehicle and is in a direct field of view of the vehicle, the server may initiate or activate a camera of the electronic device to capture images or videos of the vehicle. The camera may include a zoom lens for directing image light toward an image sensor and a shutter for regulating exposure time. Both the zoom lens and the shutter may be controlled by a microprocessor of the electronic device in response to control signals received from the server including a shutter release for initiating image capture. The camera may further include a flash unit, which may be used to illuminate the scene when needed. The image sensor may include a discrete number of photo site elements or pixels arranged in an array to form individual photo sites corresponding to the pixels of the image of the vehicle. The image sensor can be either a charge coupled device sensor or a complementary metal oxide semiconductor imager.

The camera may be operable in a regular mode and a panoramic mode, and in different angles to capture the images and the video of the vehicle. In the regular mode, the camera may capture and produce individual still digital images of the vehicle. In the panoramic mode, the camera may capture and produce a series of overlapping digital images, which may be used to construct a panoramic image of the vehicle.

In a next step 408, a server may display the video stream captured in real time by the camera on a display screen of the electronic device. The server may display the video stream or the images on the display screen via the visual inspection software application, which is being accessed on the electronic device. The video stream may include a set of captured images of the vehicle. In some embodiments, the electronic device may directly display the video stream on its display screen with or without the use of the visual inspection software application.

The display screen may be an output device, which displays information such as, the images or the video content of the vehicle in pictorial form. The display screen may include a display device, circuitry, casing, and power supply. The display screen may be a thin film transistor liquid crystal display, light-emitting diode display, or an organic light-emitting diode display. The display screen may be connected to the electronic device via a digital visual interface, a display port, a thunderbolt, and low-voltage differential signaling.

In a next step 410, a server may execute an image recognition protocol on each captured image or video. Initially, the server may determine using the direction sensor whether the captured images and videos were captured by the camera when the camera was directly viewing the vehicle. This is to confirm that the captured images and videos are of the vehicle, which has to be inspected. Upon successfully confirming that the captured images and videos are of the vehicle to be inspected, the server may execute the image recognition protocol on each captured image or video associated with the vehicle to be inspected.

The image recognition protocol may include one or more image processing algorithms. The image processing algorithms may include software programs. The image processing algorithms may be machine-learning algorithms, which may be trained using a training dataset. The training dataset may include digital images of different types of vehicles and different types of elements in each vehicle.

The server may use the image recognition protocol to recognize and identify one or more elements of the vehicle within each captured image of the vehicle. The image recognition protocol may further assist to determine position information of each of the one or more elements in the vehicle based on information in the captured images or videos and camera parameters. The image recognition protocol may further assist to determine orientation information of each of the one or more elements in the vehicle based on information in the captured images or videos and the camera parameters. The image recognition protocol may further assist to identify a location of each of the one or more elements in the vehicle. After recognition of each element within each captured image of the vehicle, the server may store information associated with each element, such as a type of element (for example, a headlight, a taillight, a side view mirror, etc.), a physical shape of the element, a geometry of the element, a size of the element, a color of the element, and geographic coordinates of each element within the vehicle in the database.

In a next step 412, a server may compare current information associated with each element in each captured image of the vehicle with reference images of the vehicle. For example, the server may compare the current information associated with a first element (such as, a first headlight) in the first captured image of the vehicle with reference information associated with the first element in a reference image of the vehicle. The current information associated with the first element may include a physical shape of the first element, a size of the first element, a color of the first element, etc. Similarly, the reference information associated with the first element may include an original physical shape of the first element, an original size of the first element, an original color of the first element, etc.

In one instance, based on the comparison, the server may determine that the current information associated with the first element is same as the reference information associated with the first element. This may imply that the first element, which is the first headlight, is in appropriate condition. The server may generate and display a first composite image not captured by the camera on the display screen of the electronic device. The first composite image may be overlaid on the first captured image, which is being presented on the display screen. This allows enrichment and augmentation of the first captured image with additional computer generated content, such as the first composite image, which may be presented to the user in a form of a graphical layer overlaying the real-world scenery in the augmented reality view, and as a result providing an augmented reality user-experience on their electronic device.

The first composite image may include a first graphical indicator corresponding to a status of an inspection of the first element. The first graphical indicator may include a check mark symbol. The check mark symbol may visually indicate to the user that the first element has passed an inspection. The first composite image may be disposed within a field of view of the user and may visually distinguish the first graphical indicator from all other elements in the first captured image.

The first graphical indicator may be in control of the user such that a manipulation of the first graphical indicator is intended to be communicative of user instructions. The user may interact with the first graphical indicator through hand gestures, tool gestures, or voice commands. The first graphical indicator may be selectively positioned for purposes of communicating instructions to an applications program of the visual inspection software application controlling the display screen of the electronic device, in response to the user interaction with the first graphical indicator. In response to receiving the instructions, the applications program may cause a first notification to pop up on the display screen. The first notification may include a text memo. The text memo may include a message that the first element has passed the inspection.

In another instance, based on the comparison, the server may determine that the current information associated with the first element is different from the reference information associated with the first element. This may imply that the first element, which is the first headlight, is not in the proper condition or may be damaged. The server may generate and display a second composite image not captured by the camera on the display screen of the electronic device. The second composite image may be overlaid on the first captured image, which is being presented on the display screen. This allows enrichment and augmentation of the first captured image with additional computer generated content, such as the second composite image, which may be presented to the user in the form of the graphical layer overlaying the real-world scenery in the augmented reality view, and as a result providing the augmented reality user-experience on their electronic device.

The second composite image may include a second graphical indicator corresponding to the status of the inspection of the first element. The second graphical indicator may be a cross mark symbol. The cross mark symbol may visually indicate to the user that the first element has failed the inspection. The second composite image may be disposed within the field of view of the user and may visually distinguish the second graphical indicator from all other elements in the first captured image.

The second graphical indicator may be in control of the user such that the manipulation of the second graphical indicator is intended to be communicative of user instructions. The user may interact with the second graphical indicator through hand gestures, tool gestures, or voice commands. The second graphical indicator may be selectively positioned for purposes of communicating instructions to the applications program of the visual inspection software application controlling the display screen of the electronic device, in response to the user interaction with the second graphical indicator. In response to receiving the instructions, the applications program may cause a second notification to pop up on the display screen. The second notification may include a text memo. The text memo may include a message that the first element has failed the inspection.

In a next step 414, a server may update a data record associated with the vehicle. The data record associated with the vehicle may include a name of all elements of the vehicle. Once the server compares the current information associated with each element of the vehicle with the reference information associated with each element of the vehicle, the server may update the data record of the vehicle by submitting the status of inspection for each element of the vehicle. In one embodiment, the server may update the data record of the vehicle as soon as the inspection for each element is being completed. In another embodiment, the server may update the data record of the vehicle after the inspection of all the elements are completed.

Once the server updates the data record of the vehicle, the server may generate an updated data record of the vehicle. The updated data record may include a most recent status of the inspection of each element of the vehicle. The server may store the updated data record in the database. The server may present the updated data record on one portion of the display screen.

In a next step 416, a server may count a number of elements of the vehicle that have passed or failed the inspection. In one embodiment, when the number of elements that have passed the inspection (for example, 30) is more than a first predetermined number (for example, 28), the server may generate and display a graphical component on the display screen of the electronic device. The graphical component may indicate a successful completion of the inspection of the vehicle. In another embodiment, only when the number of elements that have passed the inspection (for example, 30) is more than the first predetermined number (for example, 28) and the number of elements that have failed the inspection (for example, 3) is less than a second predetermined number (for example, 5), the server may generate and display the graphical component on the display screen of the electronic device. The graphical component may indicate the successful completion of the inspection of the vehicle. The graphical component may be represented as an animated character or a symbol. The graphical component may include a web link to download a vehicle inspection report. The vehicle inspection report may include a first list of all elements that passed the inspection. The vehicle inspection report may also include a second list of all elements that have failed the inspection.

Non-Limiting Example

Using the methods and systems described herein, a user may conduct a vehicle inspection using only his phone. The mobile device may capture images of the vehicle and feed the images into the visual inspection software application (e.g., a secure application installed on the user's mobile device). In order to perform the remote inspection, the user may initiate the application on his mobile device (e.g., a smart phone that is equipped with a camera). The application may use the methods and systems herein to inspect the user's vehicle. For instance, the application may be in communication with a back end server, such as the server 110 described in FIG. 1.

Upon initiating the application, the user's mobile device establishes an electronic communication with a computing device of the vehicle. For example, the mobile device may communicate with a processor associated with the user's vehicle (using wireless technology described herein) to receive data associated with the vehicle, indicating make, model, and other identification information about the vehicle.

The application then retrieves a multi-dimensional wireframe associated with the vehicle. For instance, the application may query a database to identify a multi-dimensional wireframe of the vehicle using the vehicles make and model. As described above, the multi-dimensional wireframe is a three-dimensional machine-readable visual representation of the vehicle. The application may use the wireframe to identify an overall shape of the vehicle. The application may also identify location of various features of the vehicle (e.g., location of door handles and gas tank).

The application then retrieves direction data from the mobile device. The application may continuously and periodically retrieve direction data from one or more sensors associated with the mobile device. Using the directional data, the application may identify whether the mobile device's camera is facing the vehicle or another vehicle located nearby. For instance, the application may prompt the user to scan the vehicle (e.g., walk around the vehicle while a camera captures images of the vehicle). The application may use image registration techniques (e.g., visual odometry) to generate a coordinate system associated with the vehicle. If the camera direction is inconsistent with the coordinates of the vehicle, the application may display a notification to the user requesting the user to adjust the camera by pointing the camera towards the vehicle.

The application may also initiate a camera associated with the mobile device. The user may use the camera to visually inspect the vehicle. In some embodiments, the user may capture and transmit various images of different features of the vehicle where the application analyzes the captured images to identify whether various features are satisfactory. In some other embodiments, the user may face the camera towards a particular feature of the vehicle where the application analyzes the images in real time and displays a composite image indicating whether the feature is satisfactory.

For instance, the application may display a prompt instructing the user to face the camera towards the left tail light of the vehicle. The application executing on the mobile device continuously and periodically monitors the images received from the camera. While the camera is pointed towards the direction of the taillight, the application may compare the taillight image with a retrieved image of the vehicle's make and model. If the taillight has any visual defects (e.g. if the taillight is broken), the application may generate a red "X" and display, using augmented reality display techniques, the red "X" when the camera faces the taillight. The red "X" indicates that the tail light did not pass the visual inspection.

The application then prompts the user to face the camera in a direction of the right tail light. When the application determines that the right tail light has no visual defects, the application displays a green tick mark using augmented reality techniques (e.g., the user will see the image captured by the camera in conjunction with the green tick mark generated by the application). The application may prompt the user to continue with other features of the vehicle until a predetermined list of features have been visually examined. When all features have been examined, the application may generate an overall report indicating features of the vehicle that have "passed" or "not passed" the inspection.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present subject matter.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via memory sharing, message passing, token passing, network transmission, or the like.

The actual software code or specialized control hardware used to implement these systems and methods is not limiting of the subject matter. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
    establishing, by a server associated with an electronic device, an electronic communication session with a processor of a vehicle, wherein the server receives a unique identifier of the vehicle during the electronic communication session, and wherein the server monitors a distance between the electronic device and the vehicle;
    retrieving, by the server from a database, a multi-dimensional wireframe of the vehicle based on the unique identifier;
    determining, by the server, a position and a direction of the electronic device relative to the vehicle using a direction sensor of the electronic device when a user operating the electronic device scans the vehicle using a camera of the electronic device;
    displaying, by the server on the electronic device, a layout of a first element of the vehicle, wherein the multi-dimensional wireframe of the vehicle represents a corresponding first element of the vehicle from a particular position and direction relative to the vehicle, and wherein the server prompts the user to move the electronic device until the position and direction of the electronic device relative to the vehicle matches the particular position and direction relative to the vehicle to align the first element displayed on the electronic device with the corresponding first element of the vehicle;
    when the corresponding first element of the vehicle is aligned with the first element displayed on the electronic device, causing, by the server, the camera to capture a first image of the vehicle comprising the first element;
    retrieving, by the server, a set of reference images corresponding to a set of elements of the vehicle to be inspected including the first element based on the unique identifier;
    when the first element in the first image matches a corresponding first element in the set of reference images, displaying, by the server on the electronic device, a composite image not captured by the camera, wherein the composite image is overlaid on the first image, the composite image comprising a notification corresponding to a status of an inspection of the first element; and
    displaying, by the server, a graphical component corresponding to a successful completion of the inspection when a set of elements within captured images of the vehicle matches corresponding elements of the vehicle within the set of reference images.

2. The method according to claim 1, further comprising updating, by the server, a data record corresponding to the first element in the first image to generate an updated data record, the updated data record comprises the status of the inspection corresponding to the first element.

3. The method according to claim 1, further comprising displaying, by the server, the graphical component corresponding to the successful completion of the inspection when a predetermined number of elements within the captured images of the vehicle matches the corresponding elements of the vehicle within the set of reference images.

4. The method according to claim 3, wherein the graphical component is represented as an animated character.

5. The method according to claim 3, wherein the user of the electronic device interacts with the graphical component through hand gestures, tool gestures, or voice commands.

6. The method according to claim 1, wherein the graphical component corresponds to a vehicle inspection report.

7. The method according to claim 6, wherein the vehicle inspection report comprises a list of elements that passed the inspection.

8. The method according to claim 1, wherein the database stores the set of reference images associated with the vehicle.

9. The method according to claim 1, wherein the user of the electronic device interacts with the composite image through hand gestures, tool gestures, or voice commands.

10. The method according to claim 1, wherein the multi-dimensional wireframe comprises a three-dimensional model in which a layout of the vehicle is represented by lines and vertices.

11. A system comprising:
    a server in communication with an electronic device, the server comprising a processor and a non-transitory computer-readable medium containing instructions that when executed by the processor causes the processor to perform operations comprising:
    establish an electronic communication session between the electronic device and a processor of a vehicle, wherein the server receives a unique identifier of the vehicle during the electronic communication session, and wherein the server monitors a distance between the electronic device and the vehicle;
    retrieve from a database, a multi-dimensional wireframe of the vehicle based on the unique identifier;
    determine a position and a direction of the electronic device relative to the vehicle using a direction sensor of the electronic device when a user operating the electronic device scans the vehicle using a camera of the electronic device to generate scan data;
    display on the electronic device, a layout of a first element of the vehicle, wherein the multi-dimensional wireframe of the vehicle represents a corresponding first element of the vehicle from a particular position and direction relative to the vehicle, and wherein the server prompts the user to move the electronic device until the position and direction of the electronic device relative to the vehicle matches the particular position and direction relative to the vehicle to align the first element displayed on the electronic device with the corresponding first element of the vehicle;

when the corresponding first element of the vehicle is aligned with the first element displayed on the electronic device, cause the camera to capture a first image of the vehicle comprising the first element;

retrieve a set of reference images corresponding to a set of elements of the vehicle to be inspected including the first element based on the unique identifier;

when the first element in the first image matches a corresponding first element in the set of reference images, display on the electronic device, a composite image not captured by the camera, wherein the composite image is overlaid on the first image, the composite image comprising a notification corresponding to a status of an inspection of the first element; and display a graphical component corresponding to a successful completion of the inspection when a set of elements within captured images of the vehicle matches corresponding elements of the vehicle within the set of reference images.

12. The system according to claim 11, wherein the server is further configured to update a data record corresponding to the first element in the first image to generate an updated data record, the updated data record comprises the status of the inspection corresponding to the first element.

13. The system according to claim 11, wherein the server is further configured to display the graphical component corresponding to the successful completion of the inspection when a predetermined number of elements within the captured images of the vehicle match the corresponding elements of the vehicle within the set of reference images.

14. The system according to claim 13, wherein the graphical component is represented as an animated character.

15. The system according to claim 13, wherein the user of the electronic device interacts with the graphical component through hand gestures, tool gestures, or voice commands.

16. The system according to claim 11, wherein the graphical component corresponds to a vehicle inspection report.

17. The system according to claim 16, wherein the vehicle inspection report comprises a list of elements that passed the inspection.

18. The system according to claim 11, wherein the database stores the set of reference images associated with the vehicle.

19. The system according to claim 11, wherein the user of the electronic device interacts with the composite image through hand gestures, tool gestures, or voice commands.

20. The system according to claim 11, wherein the multi-dimensional wireframe comprises a three-dimensional model in which a layout of the vehicle is represented by lines and vertices.

* * * * *